United States Patent
Cavanaugh et al.

(10) Patent No.: US 12,228,397 B2
(45) Date of Patent: Feb. 18, 2025

(54) SENSOR-ENABLED SYSTEM AND METHOD FOR MONITORING THE HEALTH, CONDITION, AND/OR STATUS OF RAIL TRACK INFRASTRUCTURE

(71) Applicant: Tensar International Corporation, Alpharetta, GA (US)

(72) Inventors: Joseph Cavanaugh, Alpharetta, GA (US); Matthew Hammond, Alpharetta, GA (US); John Wallace, Alpharetta, GA (US)

(73) Assignee: Tensar International Corporation, Alpharetta, GA (US)

( * ) Notice: Subject to any disclaimer, the term of this patent is extended or adjusted under 35 U.S.C. 154(b) by 319 days.

(21) Appl. No.: 17/796,800

(22) PCT Filed: Feb. 1, 2021

(86) PCT No.: PCT/US2021/016069
§ 371 (c)(1),
(2) Date: Aug. 1, 2022

(87) PCT Pub. No.: WO2021/155362
PCT Pub. Date: Aug. 5, 2021

(65) Prior Publication Data
US 2023/0056156 A1 Feb. 23, 2023

Related U.S. Application Data

(60) Provisional application No. 63/030,485, filed on May 27, 2020, provisional application No. 62/967,733, (Continued)

(51) Int. Cl.
*G01B 7/16* (2006.01)
*B61L 23/04* (2006.01)
(Continued)

(52) U.S. Cl.
CPC .......... *G01B 7/18* (2013.01); *E01F 9/30* (2016.02); *G01L 1/205* (2013.01); *G01L 1/22* (2013.01);
(Continued)

(58) Field of Classification Search
CPC ... G01B 7/18; E01F 9/30; G01L 1/205; G01L 1/22; G01L 5/101; G01L 5/102;
(Continued)

(56) References Cited

U.S. PATENT DOCUMENTS 5,945,596 A * 8/1999 Burkel ............... F02D 41/3836
73/114.38
12,000,095 B1 * 6/2024 Sylvester ............. G01G 19/025
(Continued)

FOREIGN PATENT DOCUMENTS

| CN | 101229814 A | 7/2008 |
| CN | 203320507 U | 12/2013 |

(Continued)

OTHER PUBLICATIONS

WO2019/233531A1—English translation used for the citations (Year: 2019).*

(Continued)

*Primary Examiner* — Kristina M Deherrera
*Assistant Examiner* — Fatemeh Esfandiari Nia
(74) *Attorney, Agent, or Firm* — E. Eric Mills; Bryan L. Baysinger; Maynard Nexsen PC

(57) ABSTRACT

A sensor-enabled geogrid system for and method of monitoring the health, condition, and/or status of rail track infrastructure is disclosed. In some embodiments, the sensor-enabled geogrid system includes a sensor-enabled geogrid that further includes a geogrid holding an arrangement of one or more sensors. The sensor-enabled geogrid system further includes a communication means or network (Continued)

for collecting information and/or data from the sensor enabled geogrid about the health, condition, and/or status of rail track infrastructure. Further, a method of using the presently disclosed sensor-enabled geogrid system for monitoring the health, condition, and/or status of rail track infrastructure is provided.

17 Claims, 24 Drawing Sheets

Related U.S. Application Data filed on Jan. 30, 2020, provisional application No. 62/967,736, filed on Jan. 30, 2020.

(51) Int. Cl.
| | | |
|---|---|---|
| *B61L 27/53* | (2022.01) | |
| *E01F 9/30* | (2016.01) | |
| *G01L 1/20* | (2006.01) | |
| *G01L 1/22* | (2006.01) | |
| *G01N 3/18* | (2006.01) | |
| *G01N 3/60* | (2006.01) | |

(52) U.S. Cl.
CPC ................. *G01N 3/18* (2013.01); *G01N 3/60* (2013.01); *B61L 23/048* (2013.01); *B61L 27/53* (2022.01)

(58) Field of Classification Search
CPC .... G01N 3/18; G01N 3/60; G01N 2203/0676; B61L 23/048; B61L 27/53; B61L 23/042; G01S 13/885; E01C 23/01; G01M 5/0041; G01M 5/0066; E02D 1/00; E02D 1/022; E01B 2/006
See application file for complete search history.

(56) References Cited

U.S. PATENT DOCUMENTS

| | | | |
|---|---|---|---|
| 2002/0154029 A1 | 10/2002 | Watters et al. | |
| 2004/0062615 A1 | 4/2004 | Walsh | |
| 2006/0021447 A1* | 2/2006 | Hecht | E02D 5/22 73/803 |
| 2006/0170535 A1* | 8/2006 | Watters | G01K 5/483 340/870.07 |
| 2007/0044566 A1* | 3/2007 | Harrison | B61L 23/048 73/760 |
| 2010/0180691 A1 | 7/2010 | Hatami et al. | |
| 2012/0090400 A1* | 4/2012 | Hatami | E02D 17/202 264/105 |
| 2015/0219576 A1 | 8/2015 | Rudahl et al. | |
| 2016/0159381 A1 | 6/2016 | Fahmy | |
| 2017/0260700 A1* | 9/2017 | Walsh | B29C 55/14 |
| 2018/0262571 A1 | 9/2018 | Akhtar | |
| 2019/0187086 A1 | 6/2019 | Burkey et al. | |
| 2019/0196428 A1 | 6/2019 | Funk et al. | |

FOREIGN PATENT DOCUMENTS

| | | | | |
|---|---|---|---|---|
| CN | 109459094 A | | 3/2019 | |
| CN | 110206008 A | | 9/2019 | |
| GB | 2416034 A | * | 1/2006 | ............... B61K 9/08 |
| WO | WO-2011016857 A2 | * | 2/2011 | ........... B62D 57/024 |
| WO | 2016098134 A1 | | 6/2016 | |
| WO | 2016130804 A1 | | 8/2016 | |
| WO | 2017182977 A1 | | 10/2017 | |
| WO | 2019233531 A1 | | 12/2019 | |

OTHER PUBLICATIONS

"Use of Geogrid in Subgrade Ballast Systems of Railroads Subjected to Cyclic Loading for Reducing Maintenance", B M Das, California State University, 2013 (Year: 2013).*
International Search Report and Written Opinion issued in counterpart PCT Application No. PCT/US2021/016069 dated Apr. 21, 2021 (ten (10) pages).
Yazdani, Hessam et al. 2016. "Sensor-Enabled Geogrids for Performance Monitoring of Reinforced Soil Structures." Journal of Testing and Evaluation. 13 pages.

* cited by examiner

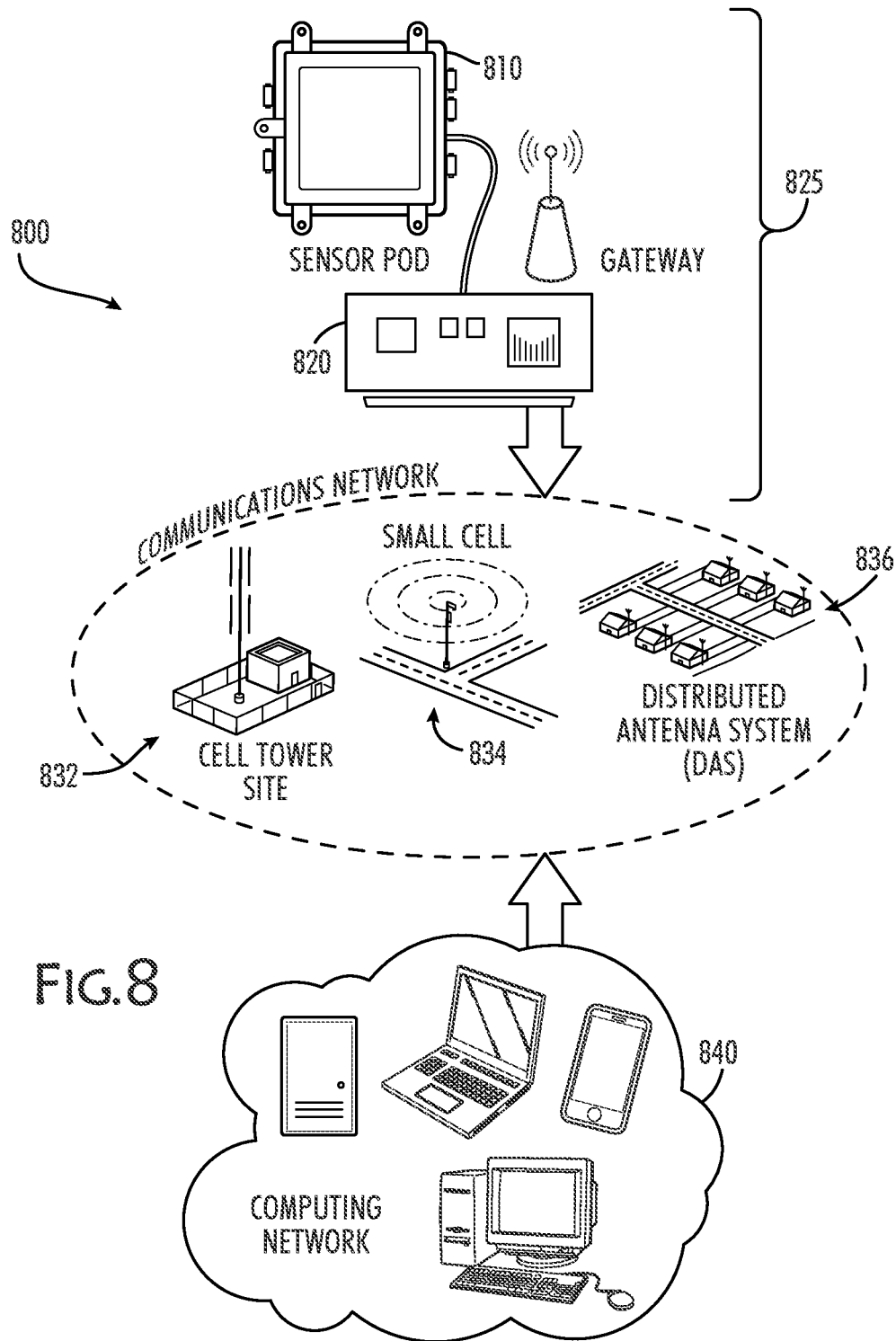

FLEX GAUGE

ACCELEROMETER

TEMPERATURE SENSOR

MOISTURE SENSOR

STRAIN GAUGE

SENSOR-ENABLED SYSTEM AND METHOD FOR MONITORING THE HEALTH, CONDITION, AND/OR STATUS OF RAIL TRACK INFRASTRUCTURE

CROSS REFERENCE TO RELATED APPLICATIONS

The present patent application is a 35 U.S.C. § 371 U.S. national phase entry of International Application No. PCT/US2021/016069 having an international filing date of Feb. 1, 2021, which claims the benefit and priority of U.S. Provisional Patent Application No. 62/967,733, filed on Jan. 30, 2020, titled "SENSOR-ENABLED GEOGRID SYSTEM FOR AND METHOD OF MONITORING THE HEALTH, CONDITION, AND/OR STATUS OF INFRASTRUCTURE," as well as U.S. Provisional Application No. 62/967,736, filed on Jan. 30, 2020, titled "SENSOR-ENABLED GEOGRID SYSTEM FOR AND METHOD OF MONITORING THE HEALTH, CONDITION, AND/OR STATUS OF RAIL TRACK INFRASTRUCTURE," and U.S. Provisional Application No. 63/030,485, filed on May 27, 2020, titled "SENSOR-ENABLED SYSTEM FOR AND METHOD OF MONITORING THE HEALTH, CONDITION, AND/OR STATUS OF PAVEMENT AND VEHICULAR INFRASTRUCTURE," the contents of which are hereby incorporated by reference in their entireties.

FIELD

The present disclosure relates generally to structural health monitoring and more particularly to a sensor-enabled geogrid and/or platform for monitoring the health, condition, and/or status of rail track infrastructure.

BACKGROUND

Sensing technologies that provide data to evaluate the condition or health of infrastructure are in common usage in applications such as bridges, tunnels, and buildings. These applications are commonly referred to as Structural Health Monitoring (SHM). Other infrastructure, such as roads, rail, parking lots, drill platforms, buildings, walls and slopes, and marine applications, could also benefit from utilizing sensors that provide data that can be used to evaluate their condition. However, adding sensors to these applications has traditionally been difficult due to the need to remove existing materials and ensure accurate placement of the sensors to provide meaningful data. These problems are further exacerbated by the location and scale of installed infrastructure, as well as often unforgiving surrounding environments.

Accordingly, various infrastructure applications could benefit from SHM if accurate sensor data were available that could be utilized to assess the conditions affecting the structures. For example, in rail applications, moisture building under the track ballast is a known problem that can weaken the ballast structure and the soils below the ballast, resulting in degradation and movement of the rail track and the eventual need to repair. In some cases, tracks can be weakened such that the speed of the train must be reduced or (in extreme cases) derailments could occur.

Currently, the health and/or condition and status of infrastructure is typically assessed by visual inspection. Visual inspection suffers from the problem of only being able to see what is above ground. Additionally, visual inspections are time consuming, require personnel to be on site to perform the inspection, and suffer from subjectivity in terms of the judgement of the severity of the condition. In many cases, once a problem has been discovered by a visual inspection, the damage has already occurred to the substructure (the soil, aggregate, ballast, sub-ballast, subgrade, etc.) and major repair work may be required (often times in an emergency manner and at an increased cost). There is a long sought need to improve conditions around infrastructure maintenance, health, and condition through systematic monitoring. The disclosure herein attempts to remove human error and remove the labor intensive task of visual inspection. The disclosure seeks to provide teams and organizations with meaningful feedback and understanding of infrastructure health and condition. In doing so, the system and methods herein provide a proactive maintenance program, replacing often reactive measures.

SUMMARY

Aspects of sensor enabled systems and methods for monitoring the structural health, integrity, and condition of rail track infrastructure are disclosed. Infrastructure is referred to herein as different embodiments, such as rail track infrastructure, infrastructure surrounding rail track, including pavement, and building infrastructure, working platforms, and other civil and geotechnical engineering-related infrastructure in which a geogrid, geofabric, or other geosynthetics are used.

In one aspect a plurality of sensors is equipped to, and configured with, a geogrid to form a sensor enabled geogrid. The sensor enabled geogrid provides intelligence and understanding of infrastructure, including the status and health and/or condition of the rail track infrastructure. Such intelligence is transmitted along a series of communication and computing networks; this type of system is often referred to as an Internet of Things (IoT) platform. In an IoT platform physical objects are embedded with sensors, software, and technologies that allow for connecting and exchanging data to systems over the Internet.

In one aspect a system for rail track infrastructure intelligence is disclosed. Wherein the system for rail track infrastructure intelligence includes rail track infrastructure. The rail track infrastructure comprises rail tracks, ballast material, a sensor enabled geogrid, and subgrade material. Further, the rail track infrastructure includes a microcontroller, wherein the microcontroller is configured to the sensor enabled geogrid. The rail track infrastructure includes a gateway, wherein the gateway is configured to the microcontroller to provide communications through a network to a computing device. Further, the computing device is equipped with a user interface and capable of communicating information to an end user regarding the status, health and/or condition of the rail track infrastructure.

In some embodiments, a sensor-enabled geogrid system for and method of monitoring the health, condition, and/or status of rail track infrastructure is disclosed. The sensor-enabled geogrid system includes a sensor-enabled geogrid and a communication means or network for collecting information and/or data about the health, condition, and/or status of rail track infrastructure. Further, in the present embodiment, the computing network includes a platform and a user facing application that reports the status and provides real time updates regarding information received from the sensors.

In some embodiments, the presently disclosed subject matter provides a sensor-enabled geogrid system for and method of monitoring the health, condition, and/or status of rail track infrastructure. The presently sensor-enabled geogrid system includes a sensor-enabled geogrid and a communication means or network for collecting information and/or data about the health, condition, and/or status of rail track infrastructure. In additional embodiments, the sensor-enabled geogrid is a sensor-enabled geofabric, or other composite utilized in the construction of or implementations commonly used in substrate layers. The sensor enabled layer is in communication with a sensor pod, wherein the sensor pod is configured with a microcontroller capable of converting the analog signals from sensors, and/or compiling the digital signals from sensors into transmittable data. In such embodiments, the sensor pod may communicate with a gateway device, wherein the gateway device is equipped to process the signals and/or transmit the signals through a communication network to a computing environment in which a user may access a portal or web application for inspection of sensor data.

In some embodiments, the presently disclosed sensor-enabled geogrid system and method provides a sensor-enabled geogrid between the sub-grade and the sub-ballast of the rail track infrastructure and thereby providing one example of a sensor-enabled rail track infrastructure. In other embodiments, the presently disclosed sensor-enabled geogrid system and method provides a sensor-enabled geogrid between the sub-ballast and the ballast of the rail track infrastructure and thereby providing another example of a sensor-enabled rail track infrastructure.

In some embodiments, the presently disclosed sensor-enabled geogrid system and method provide information and/or data about the health, condition, and/or status of rail track infrastructure that may be useful in many applications, such as, but not limited to, condition-based maintenance, lifecycle cost optimization, remaining life estimation, and capital planning. Further, in such embodiments, the sensor-enabled geogrid system and method provide a predictive algorithm through input derived from the sensors, and parameters applied at the sensor pod, the gateway, and/or at the computer network. In the example, the predictive algorithm may be used for creating an early warning system, or a system that identifies potential issues with the health, condition, and/or status of the rail track infrastructure.

The aforementioned embodiments are but a few examples of configurations of the systems, apparatuses, and methods disclosed herein. Further understanding and a detailed coverage of example embodiments follows.

BRIEF DESCRIPTION OF DRAWINGS

Many aspects of the present disclosure will be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. It should be recognized that these implementations and embodiments are merely illustrative of the principles of the present disclosure. Therefore, in the drawings:

FIG. 8 is an illustration of the IoT infrastructure of a sensor enabled geogrid;

DETAILED DESCRIPTION

Figure 1:
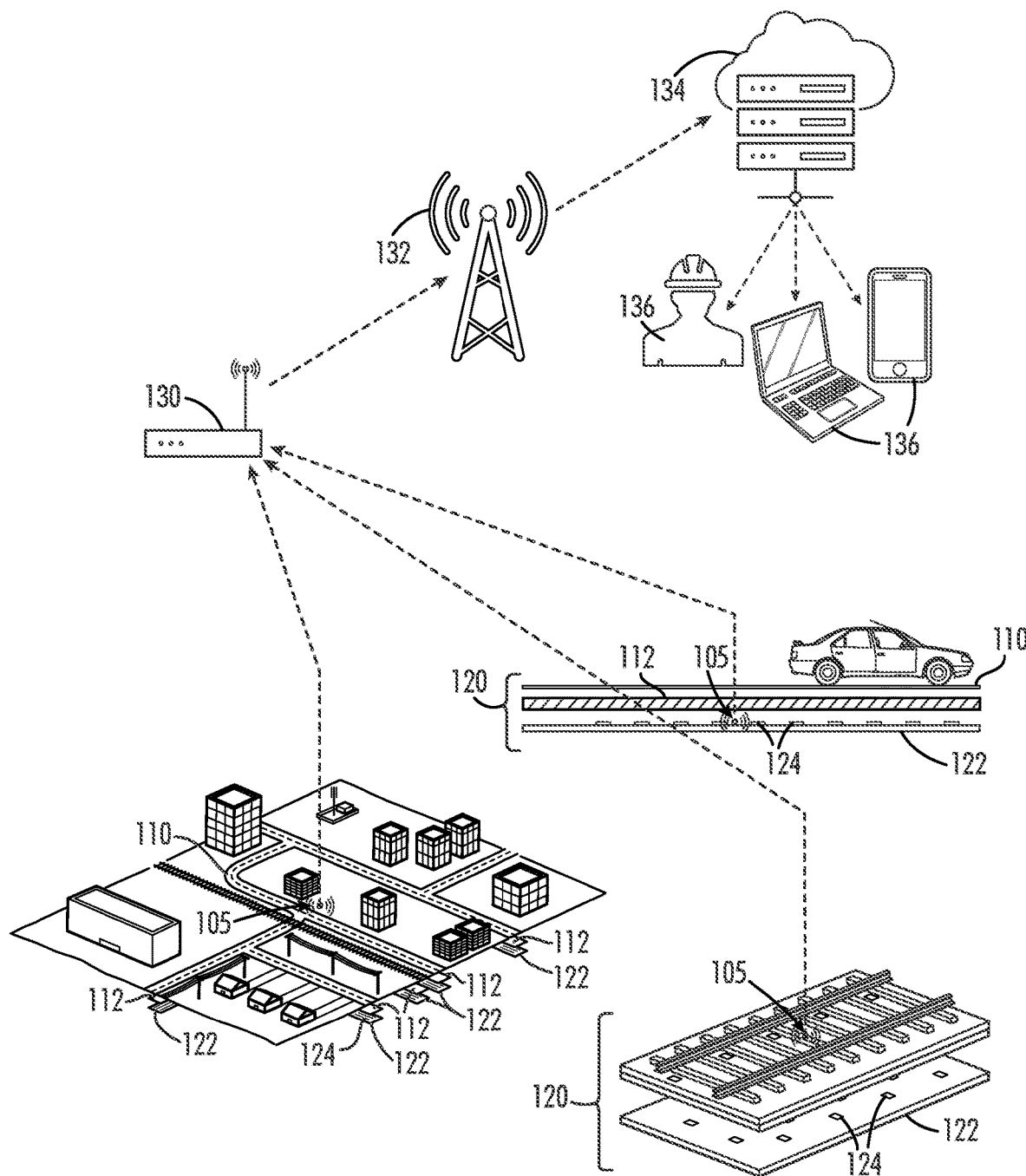
FIG. 1 is a block diagram of an example of a sensor-enabled geogrid system for monitoring the health, condition, and/or status of infrastructure.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Much of this disclosure relies on an understanding of a few basic metrics utilized in infrastructure support, including support of pavement and rail track infrastructure. One such metric or equation is the Giroud-Han (G-H) Design Method, wherein $$h = \frac{\{0.868 + CF\left(\frac{r}{h}\right)^{1.5}\}Log1N}{\{1 + 0.204[Re-1]\}} \times \left(\frac{\frac{\sqrt{P}}{\pi r^2}}{\frac{s}{fs}\{1 - 0.9\exp\left[-\left(\frac{r}{h}\right)^2\right]\}NcCu} - 1\right)r.$$

Wherein h is the required compacted aggregate (such as gravel or other aggregate material) with thickness m. CF is the calibration factor for the geosynthetic/geofabric/geogrid used in design. Re is the limited modulus ration of compacted aggregate to subgrade soil (Maximum=5.0). The r is the radius of equivalent tire contact area. Important for disclosure algorithms herein the s value is the maximum allowable rut depth. Fs is the reference rut depth. Nc is the bearing capacity factor (for unstabilized roads, Nc=3.14; for geotextile stabilized roads Nc=5.14; for geogrid stabilized roads, Nc=5.71.

Another equation is the definition of strain utilizing a strain gauge. Strain can be positive (tensile strain), or negative (compressive strain). Strain is dimensionless, unless configured in a manner to detect dimension, in practice the magnitude of strain is low and often measured in micro strains ($\mu\epsilon$). Therefore, strain is the amount of deformation of a body due to applied force. More specifically, strain ($\epsilon$) is defined as the fractional change in length with the following equation:

$$\varepsilon = \frac{\Delta L}{L}.$$

Another aspect of strain gauges is to clearly define and understand the parameter or sensitivity to strain. This sensitivity is often expressed quantitatively as the gauge factor or GF. We can determine the gauge factor using the following equation:

$$G = \frac{\frac{\Delta R}{R}}{\frac{\Delta L}{L}} \text{ or } \left(\frac{\Delta R}{R}\right)/\epsilon.$$

Wherein the gauge factor GF is defined by the ration of the fractional change in electrical resistance to the fractional change in the length (strain).

With flex sensors that are comprised of phenolic substrate resin, conductive ink, and a segmented conductor, they require understanding of the resistance generated when bent. In one example a flat flex sensor measures 25KΩ, when bent at 45° the flex sensor measures 62.5KΩ, and when bent 90° the flex sensor measures 100KΩ. Depending on the flex sensor and its specifications the resistance generated will differ and thus when described or configured herein the variability is to be expected across devices.

Additional concepts require an understanding of materials utilized in infrastructure support and management. The table provided below highlights the differences in geosynthetic materials. It is important to note that the embodiments herein are not limited to any one type of geosynthetic material, as disclosed the embodiments can be configured, attached, or adapted to a multiplicity of materials, including the substrate itself. Furthermore, a combination of materials may be utilized to accomplish the disclosure herein, including examples of layering a sensor enabled geogrid with a sensor enabled fabric.

| Geosynthetics | Polymeric Materials | Structures | Application Area | Major Functions |
| --- | --- | --- | --- | --- |
| Geotextiles | Polypropylene (PP), Polyester (PET), Polyethylene (PE), Polyamide (PA) | Flexible, permeable fabrics | Retaining walls, slopes, embankments, pavements, landfills, dams | Separation, reinforcement, filtration, drainage, containment |

| Geosynthetics | Polymeric Materials | Structures | Application Area | Major Functions |
| --- | --- | --- | --- | --- |
| Geogrids | PP, PET, high density polyethylene (HDPE) | Mesh-like planar product formed by intersecting elements | Pavements, railway ballasts, retaining walls, slopes, embankments, bridge, abutments | Reinforcement, separation |
| Geonets | Medium- density polyethylene (MDPE), HDPE | Ney-like planar product with small apertures | Dams, pipeline and drainage facilities | Drainage |
| Geomembranes | PE, polyvinyl chloride (PVC), chlorinated polyethylene (CPE) | Impervious thin sheets | Containment ponds, reservoirs, and canals | Fluid barriers/ liner |
| Geocomposites | Depending on geosynthetics included | Combination of geotextiles and geogrids/ geonets, geomembranes and geogrids | Embankments, pavements, slopes, landfills, dams | Separation, reinforcement, filtration, drainage |

Geotextiles also known as geofabrics are one concept highlighted in the table above and in which the disclosure herein may be configured with. There are three ways a geotextile can be manufactured; they are either knitted, woven, and nonwoven or any combination thereof. The distinction between woven and nonwoven is that a woven geotextile is produced by the interlacement of warp and weft yarns. These yarns may either be spun, multifilament, fibrillated, or of slit film. Nonwoven geotextiles are manufactured by mechanically interlocking or thermally bonding the fibers/filaments. The mechanical interlocking is attained through needle-punching.

With regard to function of geotextiles, they operate in several distinct functions and bear similarities to geogrids and geosynthetics. The first being separation, wherein the geotextile provides separation of particles and prevents mixing of substrates. Two such issues are fine-grained soils enter the void of the aggregate base and the aggregate punches into the fine grained soil. The first issue is a concern since it avoids adequate drainage and greatly reduces the strength of the aggregate layer which hastens infrastructure failure/erosion. The second issue is a concern because it decreases the effective thickness of the aggregate layer which also hastens road failure and/or increases infrastructure maintenance. The second prominent function of geotextiles is stabilization. The effectiveness of the geotextile stabilization results from two factors. First, the aggregate is compacted above the geotextile and individual stones are configured, which places imprints in the subgrade and geotextile. When configured, aggregates are fixed into a position, which stabilizes the aggregate base layer. The stabilization of the subgrade soil due to geotextile can change the soil failure mode from local shear to general shear. Due to this change in shear, an additional load is permitted before the soil strength is surpassed which allows for a reduced aggregate base layer. A third benefit of geofabrics is reinforcement. The benefits of reinforcement are reliant on the extent of deformation allowable in a given system. Filtration, is an additional function, wherein the defined openings in the geotextile that hold soil particles also allow for and permit fluid movement and flow. The filtration in this aspect filter the soil out, holding it in place while permitting fluids to flow through and egress.

Geogrids are geosynthetics formed with open apertures and grid-like configurations of orthogonal or non-orthogonal ribs. Geogrids are often defined as a geosynthetic material consisting of connected parallel sets of tensile ribs with apertures of sufficient size to allow for strike-through of surrounding soil, stone, or other geotechnical material. Several methods exist for producing geogrids. For example, extruding and drawing sheets of Polyethylene (PE) or Polypropylene (PP) plastic in one or two or even three or more directions, or weaving and knitting Polyester (PET) ribs. Geogrids are designed mainly to satisfy the stabilization and reinforcement function for a variety of infrastructure, including roads, rail, buildings, ground erosion, and more, however, ancillary benefits such as material cost savings and more are applicable.

Regarding the structure of geogrids, the ribs of a geogrid are defined as either longitudinal or transverse. The direction which is parallel to the direction that geogrid is fabricated on the mechanical loom is known as roll length direction, Machine Direction (MD), or longitudinal direction. On the other hand, the direction which is perpendicular to the mechanical loom and MD in the plane of geogrid, is known as Transverse Direction (TD) or cross machine direction. In other words, the longitudinal ribs are parallel to the manufactured direction (a.k.a. the machine direction); the transverse ribs are perpendicular to the machine direction. Some mechanical properties of geogrid such as tensile modulus and tensile strength are dependent on the direction which geogrid is tested. In a geogrid, the intersection of a longitudinal rib and a transverse rib is known as a junction. Junctions can be created in several ways including weaving or knitting.

Regarding the production of geogrids, geogrids are produced by either welding, extruding, and or weaving material together. Extruded geogrid is produced from a polymer plate which is punched and drawn in either one or more ways. Various aperture types are shaped based on the way the polymer sheet is drawn. Drawing in one, two or three or more directions results in production of uniaxial, biaxial, triaxial, and various other multiaxial geogrids. Polypropylene (PP) or polyester (PET) fibers are generally used to produce woven geogrids. In most cases, these fibers are coated to increase the abrasion resistance of produced geogrid. Manufacturing process of welded geogrid is by welding the joints of extruded polymer woven pieces. Geogrids are also categorized in two main groups based on their rigidity. Geogrids made from polyethylene (PE) or polypropylene (PP) fibers are usually hard and stiff and they have a flexural strength more than 1,000 g-cm. Flexible geogrids, are often made from polyester (PET) fibers by using a textile weaving process. They usually have a flexural strength less than 1,000 g-cm.

While geotextiles can be used for separation, drainage and filtration, or reinforcement, geogrids are mainly used for reinforcement and/or stabilization applications. Geogrids can also provide confinement and partial separation. The confinement is developed through the interlocking mechanism between base course aggregate particles and geogrid openings. The interlocking efficiency depends on base course aggregate particle distribution and the geogrid opening size and aperture. In order to achieve the best interlocking interaction, the ratio of minimum aperture size over D50 should be greater than three. The effectiveness of interlocking depends on the in-plane stiffness of the geogrid and the stability of the geogrid ribs and junctions. The stabilization and reinforcement mechanisms in geogrid reinforced infrastructure include lateral restraint (confinement). Lateral restraint increases bearing capacity and tension membrane effect. Aggregate base layer lateral restraint is the fundamental mechanism for geogrid reinforced infrastructure. For example, a vertical load applied on the surface of the infrastructure would cause lateral spreading motion of the aggregate base materials. As the loading is applied on the surface of the infrastructure, tensile lateral strains are generated in the base layer causing the aggregates to move out away from the loading. Geogrid stabilization and reinforcement of infrastructure restrains lateral movements, also known as lateral restraint. In doing so geogrid reinforcement changes the "failure location" from the weaker subgrade soil to the stronger aggregate layer.

Covering now various embodiments of the present disclosure. In some embodiments, the presently disclosed sensor-enabled geogrid system and method includes a geogrid as the sensor "carrier" that may be used for monitoring the health, condition, and/or status of rail track infrastructure. In similar embodiments the sensor enabled geogrid may be a multi-axial geogrid in configurations such as uniaxial, biaxial, triaxial, and hexagonal, to name a few configurations. In other embodiments the sensor carrier may be a geofabric or other substrate or soil layer holding material such as a geosynthetic, geonet, geomesh, or geocomposite.

In additional embodiments, the presently disclosed sensor-enabled geogrid system and method uses a sensor-enabled geogrid to provide "below the surface" information and/or data about the health, condition, and/or status of rail track infrastructure wherein the "below the surface" information may not otherwise be attainable by conventional means such as by visual inspection. Further, below the surface investigative equipment such as ground penetrating radar, and other instruments require equipment transported to the site and applied in a per occasion basis as well as fitted and designed to work with varying rail track installations.

In some embodiments, the presently disclosed sensor-enabled geogrid system and method for monitoring the health and/or condition of infrastructure is equipped with a sensor-enabled geogrid wherein the sensors are mounted or otherwise installed on the geogrid mesh, geofabric, or other geogrid structure. In other embodiments, the presently disclosed sensor-enabled geogrid system and method provide a sensor-enabled geogrid wherein the sensors are directly embedded in the structural members forming the geogrid. The sensors and or assemblies or structures of the sensors may be extruded with the geogrid, or in the case of fabric, may be woven or otherwise integrated with the structure so that the geogrid itself becomes one large sensor. In further embodiments, the sensors may be distributed within the infrastructure itself, and not configured with a geogrid, but configured to rigid members within structures such as rebar, aggregate, etc. In further embodiments the sensors may be strategically placed within the infrastructure, for e.g. a moisture sensor may be placed in an area where moisture readings may be better understood or acquired.

In one aspect a signal from one or more of the plurality of sensors is received by the sensor pod, wherein the sensor pod transmits it to the gateway and the gateway sends an alert to the user interface generated by the computing network and or/cloud server or application. For example, a strain gauge may indicate that strain levels have increased past threshold parameters at a specific geogrid location. The signal is processed in the gateway to identify a problem, wherein the gateway transmits data concerning the location of the affected sensor, along with a plurality of features (if the given sensors are equipped) such as ambient temperature, moisture, any movement or acceleration in the surrounding vicinity, all of which will aid the principle investigator, user, or operator in the system in identifying issues or problems with the health, condition and/or status of the given infrastructure.

In some embodiments, the presently disclosed sensor-enabled geogrid system and method provide a sensor-enabled geogrid that is easy to install and provides a straight forward mechanism for monitoring the health, condition, and/or status of infrastructure. The system is capable of plug and play aspects and being able to integrate within new infrastructure projects or be installed in a remedial basis on current existing infrastructure. The ease of installation includes the ability to run contiguous sections of sensor-enabled geogrid to form a blanket of coverage, wherein the plurality of sensors on the plurality of sensor-enabled geogrids work in unison and transmit real time feedback regarding the status of the entire installed area.

In other aspects, a sensor-enabled geogrid system, the interconnection flow or IoT network, and method of providing the status, condition and/or health of infrastructure, including pavement and rail track, as well as other infrastructure and how the system and method provides beneficial features is disclosed. Such beneficial features include, but are not limited to, (1) providing a direct sensing element in the substructure using the one or more sensors of sensor-enabled geogrid; (2) providing the ability to measure and use the flex and/or strain on the geogrid and translating the parameters about the gird performance (e.g., stress and/or strain on the geogrid ribs) into information about the substructure conditions (e.g., rutting); and (3) providing the ability to detect conditions below the surface, such as temperature, moisture, rutting, and the like.

In some embodiments, the presently disclosed sensor-enabled geogrid system and method uses a sensor-enabled geogrid to provide "below the surface" information and/or data about the health, condition, and/or status of infrastructure wherein the "below the surface" information may not otherwise be attainable by conventional means such as by visual inspection. Further, below the surface investigative equipment such as ground penetrating radar, and other instruments require equipment transported to the site and applied in a per occasion basis.

In additional aspects a plurality of sensors is equipped in substrate and/or the underlying soil layer beneath or surrounding a piece of infrastructure. In other aspects the plurality of sensors is equipped to a geofabric. The plurality of sensors, in one embodiment, is connected to a sensor pod. In one aspect the sensor pod is a protective enclosure that provides elemental protection for a microcontroller that is reading the data generated from the plurality of sensors. In another embodiment only one sensor is read by the microcontroller, in other embodiments any combination of the plurality of sensors may be interfaced and equipped to transmit signals to a microcontroller near the sensor site.

In one aspect, standard microcontrollers can be utilized, or in other cases, general purpose or special purpose computing devices. In the embodiments herein, including the figures, the microcontroller may be a general purpose computing device and/or a special purpose computing device. In one aspect a microcontroller is configured with a processing unit, cache memory, RAM, volatile or non-volatile storage system, and is equipped with a network adapter, and I/O interface. In other embodiments a microcontroller may have built in sensors and/or an array of features such as a timer, accelerometer, and more. Microcontrollers possess several distinct advantages: first, they typically have a low power requirement. Second, they are easy to use, rugged, and come with universal applications. Third, the overall cost and composition is low. Fourth, the interoperability is high—a standard feature set of data RAM, non-volatile ROM, and I/O ports allow for access to a plurality of input devices. Additional benefits of microcontrollers and adaptation of those controllers to the disclosure herein will be known to those of skill in the art.

In one aspect the sensor pod is configured to communicate via a data cable to a gateway. A gateway, in the previous aspect is a general purpose computer or microcontroller that is configured to receive data from the sensor pod, wherein the gateway is equipped to perform computational action on the data and/or to forward the collated or accumulated data through a communications network to a computing network. In the previous aspect a telecommunications network may be any communication pathway such as cellular and advanced communications standards, including but not limited to edge, 3G, 4G, 5G, LTE, satellite transmission, radio frequency (RF), microwave transmission, and millimeter wave transmission. Further, the telecommunications network may consist of wireless aspects of WiFi, Wide Area Networks, Bluetooth, Near Field Communication (NFC), and the various standards associated therewith such as WiFi 5, WiFi 6, WiFi 6e, Bluetooth 2.0, 3.0, 4.0, 5.0, and other such standards as will change or occur from advancements in the field. Further, network communications may also include wired connections such as twisted pair, coaxial, fiber optics, or other such network infrastructure and/or spectrum that will be provided for herein. In one aspect the gateway is equipped with Bluetooth and NFC as well as WiFi and cellular CDMA/GSM standards. The communications network, as common in other IoT platforms, will often travel through a series of steps or interfaces before reaching a computing network that is equipped to process and/or provide an interface for interaction with the data.

In one aspect the gateway transmits programmable instructions to a sensor pod. In another aspect the gateway receives programmable instructions from the computing network, through the telecommunication network, wherein the instructions provide updates and or configuration to the gateway. In one aspect the communication pathway from the sensor pod to the gateway, and to the computer network, is bidirectional. In another aspect it is unidirectional from the sensor pod to the computing network. In yet another aspect only portions of the network are bidirectional, for instance, the gateway and the computer network may be in bidirectional communication while the gateway and the sensor pod are in unidirectional configuration. Certain aspects of the sensor pod may benefit a unidirectional and simplification of hardware. Whereas other aspects the gateway may be incorporated into the sensor pod, wherein the sensor pod performs the role of the gateway and the sensor pod.

Turning now to FIG. 1, a block diagram of an example of the presently disclosed sensor-enabled geogrid system (100) for monitoring the health, condition, and/or status of infrastructure. In this example, sensor-enabled geogrid system (100) is built, for example, using an IoT platform that provides connectivity as well as analysis tools. An IoT platform is a multi-layer technology that enables straightforward provisioning, management, and automation of connected devices within the IoT universe. The IoT platform may be used to connect hardware devices/systems to the cloud by using flexible connectivity options, enterprise-grade security mechanisms, and broad data processing capabilities.

A sensor-enabled geogrid system (100) may include, for example, at least one sensor-enabled geogrid (120) installed, for example, in a substrate and/or underlying soil layer. In the description herein substrate and underlying soil are synonymous. Depending upon the application the infrastructure substrate layers consist of different terms and layers. For example, in pavement infrastructure the substrate or layers may consist of any of the following components in order from closest to the surface downward—a surface course, a binder course, a base course, a subbase course, a compacted subgrade, and a natural subgrade. Similarly, in a rail and track infrastructure, as discussed more later, the infrastructure comprises various layers and substrate, such as a top course, a ballast, a sub ballast, and a subgrade. In this example, sensor-enabled geogrid (120) is installed underground with respect to pavement or road infrastructure. That is, sensor-enabled geogrid (120) is installed underground beneath a ground surface (110) (e.g., a road surface) and beneath any kind of sublayer (112) (e.g., soil, aggregate, surface course, base course, subbase course, ballast, sub-ballast, subgrade).

The sensor-enabled geogrid (120) includes a geogrid (122) that is holding an arrangement of one or more sensors (124). Geogrid (122), in this example embodiment is a geogrid or geofabric that serves as a sensor "carrier" that may be used for monitoring the health, condition, and/or status of infrastructure. In one example, geogrid (122) is the TriAx® Geogrid available from Tensar International Corporation (Alpharetta, GA) and described with reference to U.S. Pat. No. 7,001,112, entitled "Geogrid or mesh structure," issued on Feb. 21, 2006. In another example biaxial geogrid is utilized as the sensor carrier. In other aspects a hexagonal geogrid is utilized as a sensor carrier. In even other aspects geofabrics are embedded with sensors and form the sensor carrier. In even further aspects the substrate itself becomes the sensor carrier.

In the example of FIG. 1, the various sensors (124) mounted to geogrid (122) essentially render the geogrid (122) a "sensor fusion point." The number, locations, and/or types of sensors (124) may vary based on the application of use. Example types of sensors (124) include, but are not limited to, temperature sensors, moisture sensors, humidity sensors, force sensors, flex sensors, strain gauges, accelerometers, inclinometers, inertial measurement units (IMU), sonar devices, image capture devices, audio capture devices, as well as other sensor types for specific applications.

For collecting information and/or data from the one or more sensors (124) of sensor-enabled geogrid (120), sensor-enabled geogrid system (100) may include one or more receiver nodes (130), also known as a gateway or gateway node. The gateway receives information from the sensor enabled geogrid (120) through either a data line (cable, fiber, coaxial, Ethernet, line-in, etc.) or from a wireless communications assembly configured to the sensor(s) (124). In the example embodiment a sensor pod (105) is configured to house a microcontroller, wherein the microcontroller is configured to receive the signals from the sensor enabled geogrid (120).

In some aspects the sensor pod (105) forms an integral part of the IoT platform by bringing computational power to the edge of the system (120), protecting the computational instruments, providing environmental protection, providing a power supply, providing a communications assembly, and many more features as will be described herein. In other aspects the sensor pod (105) is wholly incorporated into the gateway (130) also known as the gateway receiver node. In such an example the gateway (130) is connected either through a data cable, physically, or through a communications adapter attached to the sensor enabled geogrid (120) to receive signals and information from the geogrid (122). In other aspects, the sensor pod (105) and gateway (130) may perform similar tasks or be completely unique. In such embodiments as where the sensor pod (105) is adapted to configure with the sensor enabled geogrid, it receives the signals and transmits the signals to the gateway (130), wherein the gateway sends the signals and/or processed information through the network (132) to the computing network (134).

In the example of FIG. 1 the gateway (130) processes and transmits signals and information from the sensors (124) across one or more communication nodes (132), along one or more computing network systems (134), and to a user through one or more frontend interfaces (136). The gateway (130) is established along the sensor enabled geogrid (122), at the edge environment (120) typically attached to infrastructure such as poles, telephone poles, utility poles, towers, buildings, electric boxes, or other infrastructure capable of holding a gateway equipped with a wireless or wired receiver and telecommunications adapter, and that is also capable of being configured to a plurality of sensor enabled geogrid.

The gateway (130) may receive communications from the sensor(s) (124), from a sensor pod (105), or from the sensor enabled geogrid (120). The distinguishing structures may be bundled together, such that the sensor(s) (124) are configured to the sensor enabled geogrid (120) and wired directly to a sensor pod (105), in which the sensor pod (105) is wired to the gateway (130). In other aspects, they may be unbundled and each form a separate integral part, for instance, the sensors may be wired to the gateway, wherein the gateway (130) performs the functions of a sensor pod (105). In other examples the gateway (130) may be, for example, the local subnetwork nodes in direct communication with the one or more sensors (124) of sensor-enabled geogrid (120).

The communication nodes, also known as a communication network (132) may be, for example, the intermediate links between the local subnetworks (e.g., gateway 130) and the core network, which is then connected to the computing systems (134). The frontend interfaces (136) or user interfaces may be, for example, any user interfaces of any user devices. User devices may be, for example, any computing device (e.g., server, desktop computer, laptop computer, tablet device, smart phone, smart watch, cloud computing device, and the like). Further, the user devices herein are enabled to view and/or display a software platform capable of depicting the condition and/or health of infrastructure.

The communications in sensor-enabled geogrid system (100) may be by any wired and/or wireless communication means for forming a network by which information may be exchanged with other devices connected to the network. The information and/or data that is collected and/or exchanged via sensor-enabled geogrid system (100) may be any information and/or data from the one or more sensors (124) that may be useful for monitoring and/or determining the health, condition, and/or status of infrastructure, such as substructure (112) under a road or pavement, and within rail and track, as shown in FIG. 1.

Figure 2:
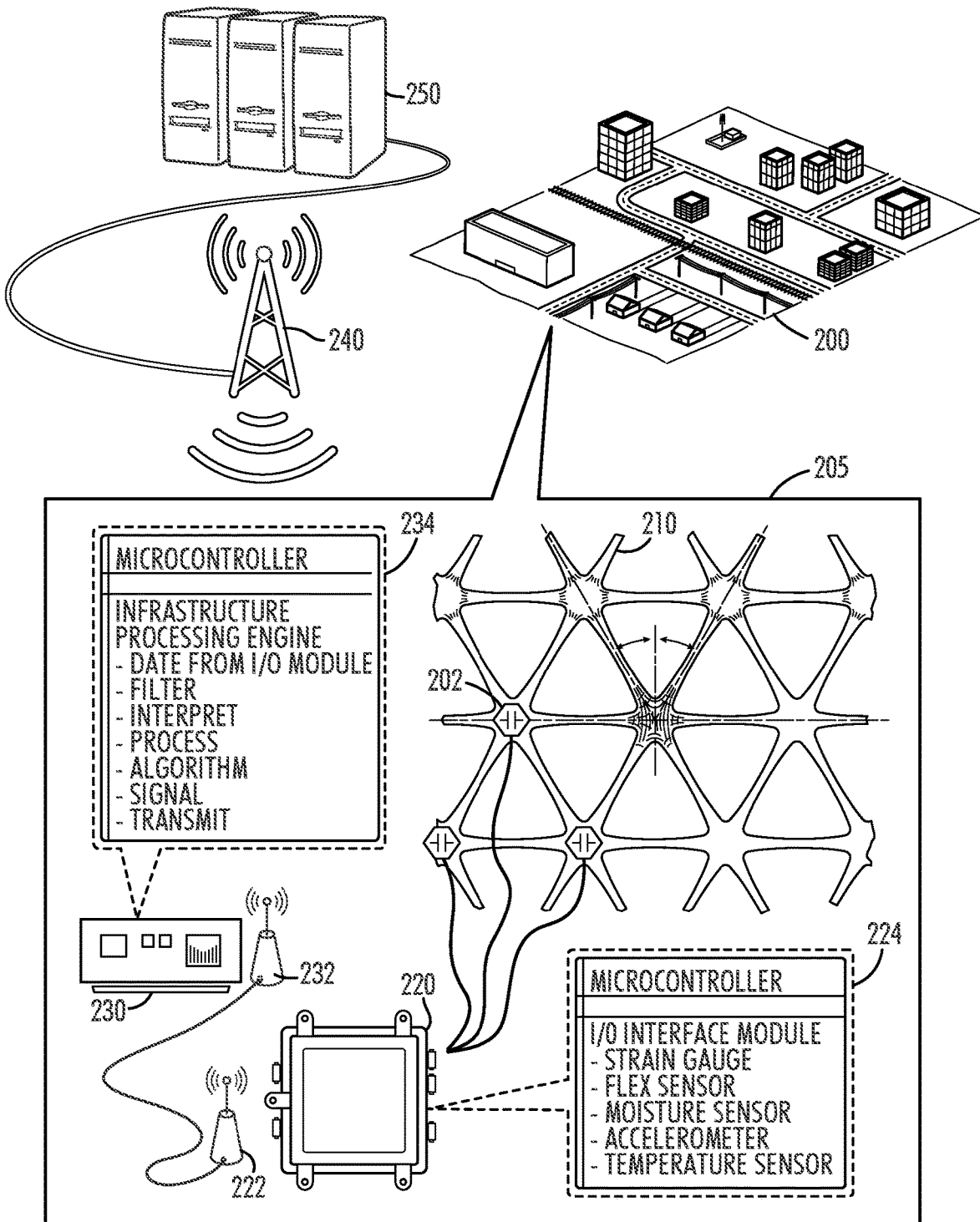
FIG. 2 illustrates an example of a sensor-enabled geogrid infrastructure for monitoring the health, condition, and/or status of infrastructure.

FIG. 2 illustrates an example of a sensor-enabled geogrid infrastructure for monitoring the health, condition, and/or status of infrastructure. In this example, information and/or data from the one or more sensors (202) of sensor-enabled geogrid (210) may supply edge data collection and connectivity (205), which then supplies a communication network (240), which then supplies a computing network (250) configured to a user Interface and Data API. The computing network (250) then supplies analytics and insights, and certain infrastructure specific applications (e.g., rail track, pavement, levee).

In the example the sensor pod (220) is an edge data collection and connectivity (205) device that may be placed alongside or configured onto the sensor enabled geogrid (210). The sensor pod is configured with a microcontroller (224), wherein the microcontroller is equipped with an input output (I/O) interface for configuring with a plurality of sensors, including but not limited to a strain gauge, a flex sensor, a moisture sensor, an accelerometer, and a temperature sensor. Depending upon the application of the disclosure herein, specific sensors will be utilized and it will be known to those of skill in the art the proper application for a given sensor. For example, a temperature sensor would likely not be present in applications with controlled climate such as underneath building infrastructure in a relatively calm climate. In addition, flex gauges may not be used when a strain gauge would suffice for material cost, and efficiencies of scale. Whether or not a specific sensory device is installed is highly relevant on the given application, a few of such examples are described in more detail, but any combination of sensors disclosed herein may be used to accomplish the task of acquiring information from a geogrid.

The microcontroller (224) housed inside of the sensor pod (220) is further configured to a power supply and a communications adapter (222). In the example the power supply is a battery, in other embodiments the battery may be connected to solar infrastructure to provide a charging source or otherwise connected to the power grid. The communications adapter (222) may be part of the microcontroller or an interfaced module, further, with scale and growth of the system a variety of communications adapters may be configured to suit the needs of the system. The communications adapter (222) at the sensor pod (220) may be hard wired to a communications adapter (232) at the gateway node or gateway receiver (230). In other aspects, the microcontroller (224) on the sensor pod (220) configures with a communications adapter (222) to transmit the received signals from the plurality of sensors (202) on the sensor enabled geogrid (210).

In one aspect, the sensor pod microcontroller (224) transmits the received signals to the gateway (230), wherein the gateway communications adapter (232) receives the signals and begins a processing routine on the gateway microcontroller (234) utilizing the infrastructure processing engine. One aspect of the infrastructure processing engine utilizes a set of parameters, for example, the processing engine acquires the base strain gauge measurement, and configures a max strain amount equal to the amount of tensile strength of the particular geogrid. In this respect the infrastructure processing engine may send alerts to the computing network (250) through the communications network (240) so that a user at the end user interface will be presented with the statics and can alert a crew to the sensor location for repair. In other aspects the infrastructure processing engine may be executing on the sensor pod microcontroller, the gateway microcontroller, or a cloud or network computing services general purpose computer (224, 234, 250). Further, the infrastructure processing engine may operate with a feedback loop to filter the incoming signals. The feedback loop may take previous signals and cancel the signals so that anomalies that are registered are logged and sent to a computing network for further processing or notification. Often times the user interface is presented via an application running on a computing network such as Amazon Web Services™, Google Cloud Services™, or Microsoft Azure Cloud Services™, to name a few. In the example of a computing network comprising Microsoft Azure Services™, the server receives information from the gateway (230) or in some cases the sensor pod (220), through a communication network (240), wherein the web services is running the application module and may also be executing the infrastructure engine or other engine such as an alert engine or health and/or condition engine. In another example, the gateway receives signals regarding moisture content, wherein the infrastructure processing engine is configured with a multi-parameter algorithm, for example the average moisture content over a seasonally adjusted period may be used in conjunction with temperature and strain to indicate an area that should be investigated for erosion or washout of a substrate layer. These examples are but a few of the algorithms capable of assessing the condition and/or health of infrastructure by the use of a sensor enabled geogrid.

Figure 3:
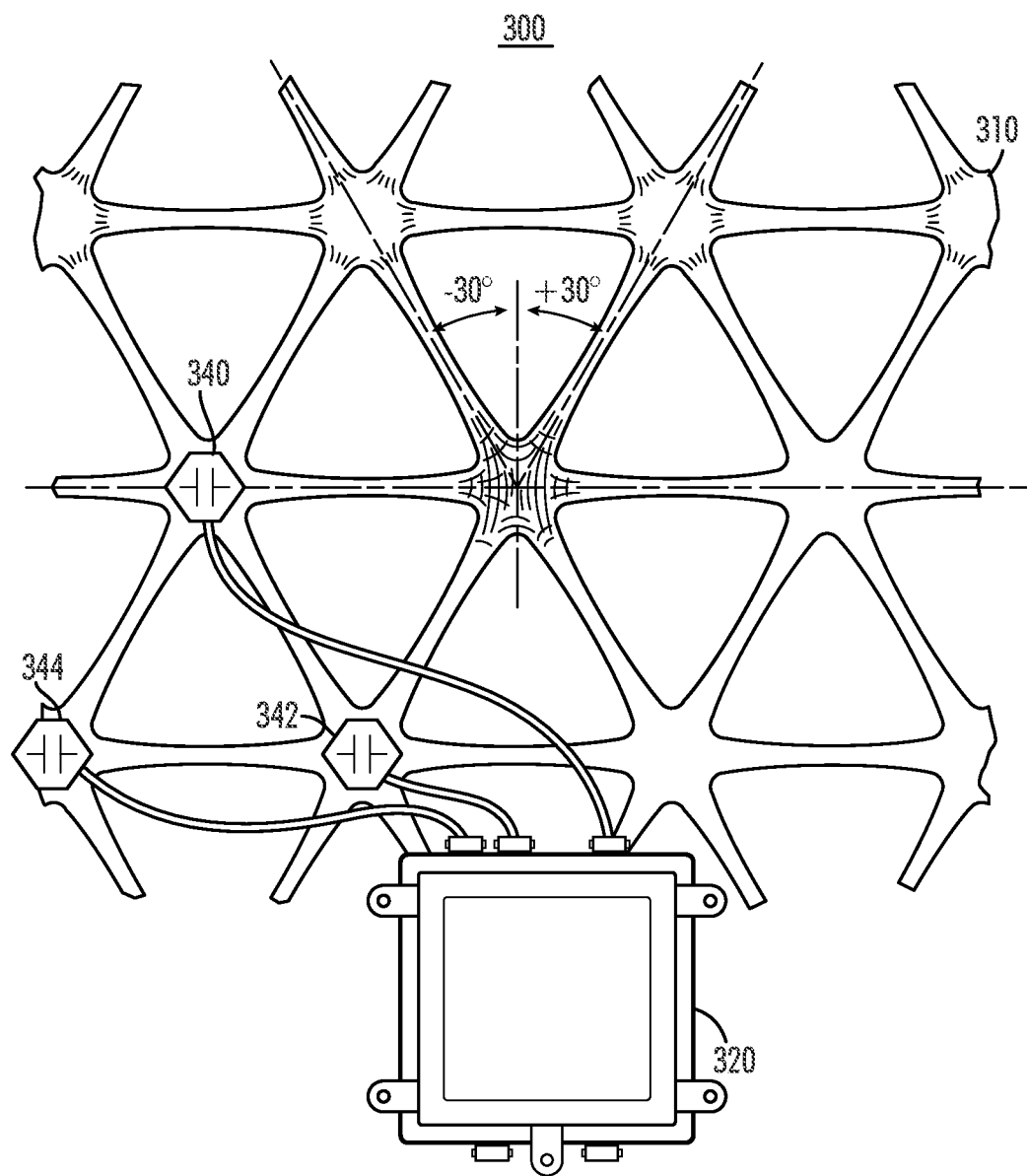
FIG. 3 illustrates an example sensor pod configured to sensors on a geogrid.

FIG. 3 is an illustration of an example of sensor-enabled geogrid (300) that includes geogrid (310) holding an arrangement of a moisture sensor (340) a strain gauge (342), and a temperature sensor (344). In this example, the sensors are mounted or otherwise installed on the mesh or surface structure of geogrid (310). The geogrid (310) is triaxial geogrid, however, in other embodiments a biaxial geogrid, or hexagonal geogrid, or geocomposite or a geofabric may be used to hold the sensors on the surface. For geofabrics, rigid members may be added upon which the strain gauge or the flex sensor may be adhered to in which to develop more precise readings.

In the example of FIG. 3, the sensor pod (320) is directly wired to the one or more sensors and the sensor pod (320) provides a power source for the one or more sensors. Further, the power and the data communications often travel in the same cable or line to the one or more sensors, often the one or more sensors is operated by detecting a change in the voltage across the sensor. For example, in a strain gauge (342) the strain gauge is comprised of electrical leads, solder pads, resistive foil, and gauge backing. Wherein the strain gauge measures changes, often minute, in resistance that are associated with strain of the gauge. In the example, multiple strain gauges may be used in a divided bridge circuit to measure changes in electrical resistance. This is often called a Wheatstone bridge configuration, in which an excitation voltage is applied across the circuit, and the output voltage is measured across two points in the middle of the bridge. When there is no load acting on the bridge, it is said to be balanced, and there is zero output voltage. Any small change in material under the strain gauge results in a change in resistance as the gauge material deforms. Since the change in resistance is often small, amplifiers may be added to strengthen the signal changes. However, such amplification may introduce increased noise, in which the microcontroller on board the sensor pod (320) may be configured to filter out, or in which the computing network may adopt an algorithm to properly handle signal noise.

In another example (not shown), the one or more sensors installed may be directly embedded in the structural members forming geogrid (310). In this example, of fully integrated sensors, the geogrid itself is extruded with the required sensors, while in other example or embodiments the sensors are adhered to the surface through physical adhesion, such as a clamp, or chemical adhesion such as an epoxy or glue adhesive. Further, power is suppled to sensor-enabled geogrid (300) by various methods including, but not limited to: (1) wiring from a power supply that would be located remotely from the grid (e.g., could be in the edge device); 2) a battery system (that could likely be for limited lifetime applications (i.e., a few years) that may be embedded or placed into the sensor pod (320) or configured alongside the sensor enabled geogrid (300); or 3) a method to generate power from mechanical vibrations (e.g., piezoelectric type system); or 4) a power supply such as a solar power array that is directly fed into a battery that is housed inside the sensor pod (320) or alongside the sensor enabled geogrid (300).

The sensor-enabled geogrid (300) is not limited to utilizing geogrid (310) for holding sensors. In other embodiments, sensor-enabled geogrid (300) may include any type of geosynthetics and/or geofabrics for holding sensors. Further, in other embodiments the sensor enabled geogrid (300) may serve as support as the various sensors are placed in layers of infrastructure.

Figure 4A:
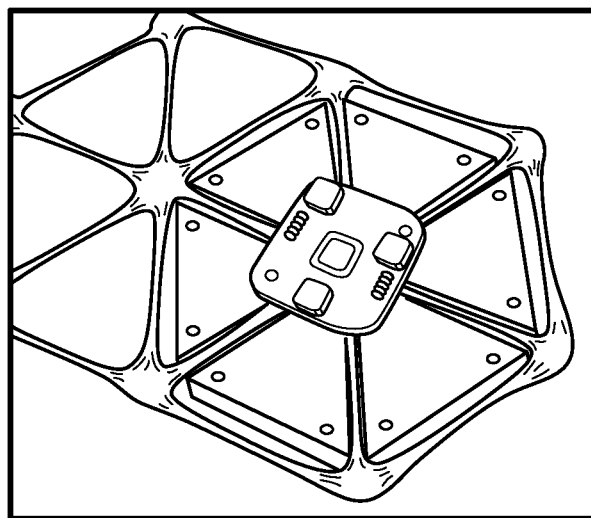
FIG. 4A illustrates an example of a sensor pod configured onto a geogrid with the internal components shown.

FIG. 4A illustrates an example of a sensor pod configured onto a geogrid, wherein the sensor pod top casing is removed to show the internal microcontroller. Additional images of the internal components of a sensor pod can be seen in FIG. 6. In the example of FIG. 4A the sensor pod contains a microcontroller and a plurality of leads to accept connection with and communicate with the one or more sensors. Further, in this aspect we can see the sensor pod is fully integrated with the geogrid as it is secured in place and attached to the surface of the geogrid. In other aspects the sensor pod may be placed alongside the geogrid, or in even further aspects the sensor pod may be placed in an exterior enclosure running alongside the geogrid. In such a remote aspect the sensor pod may also take on attributes disclosed of the gateway node or gateway receiver, in which the sensor pod is enabled with cellular or network communications to transmit the information and/or signals from the one or more sensors.

Figure 4B:
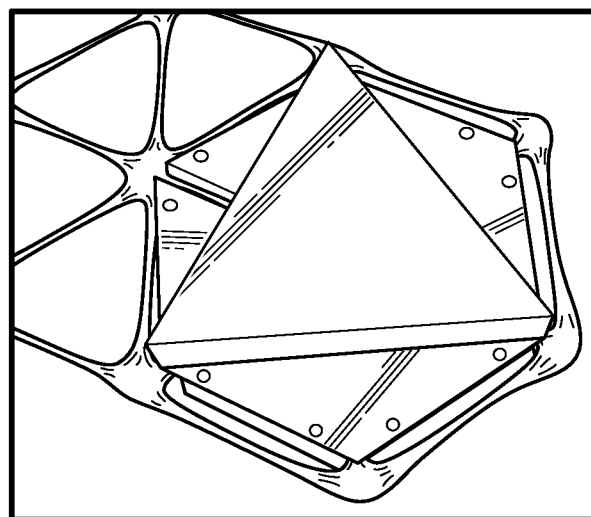
FIG. 4B illustrates an example of a sensor pod configured onto a geogrid.

FIG. 4B illustrates an example of a sensor pod configured onto a geogrid, wherein the sensor pod is fully encased in an outer shell. The outer shell is typically made of a metal or a composite that is low cost and durable enough to stand up to environmental factors. In this example embodiment the sensor pod is fully integrated to the geogrid, in such a way the sensor pod may be assembled offsite and placed into infrastructure in typical fashion by rolling the geogrid into place. In other embodiments the sensor pod is installed in the field as the geogrid is placed into the infrastructure. In this aspect the sensor pod is configured with fasteners to hold onto the exterior surface of the geogrid. In other aspects the sensor pod may be placed alongside the geogrid or not fastened in place. In this aspect the leads may be longer or coiled or made of material that will allow for settling or slight movement without becoming decoupled from the sensor pod.

Figure 5:
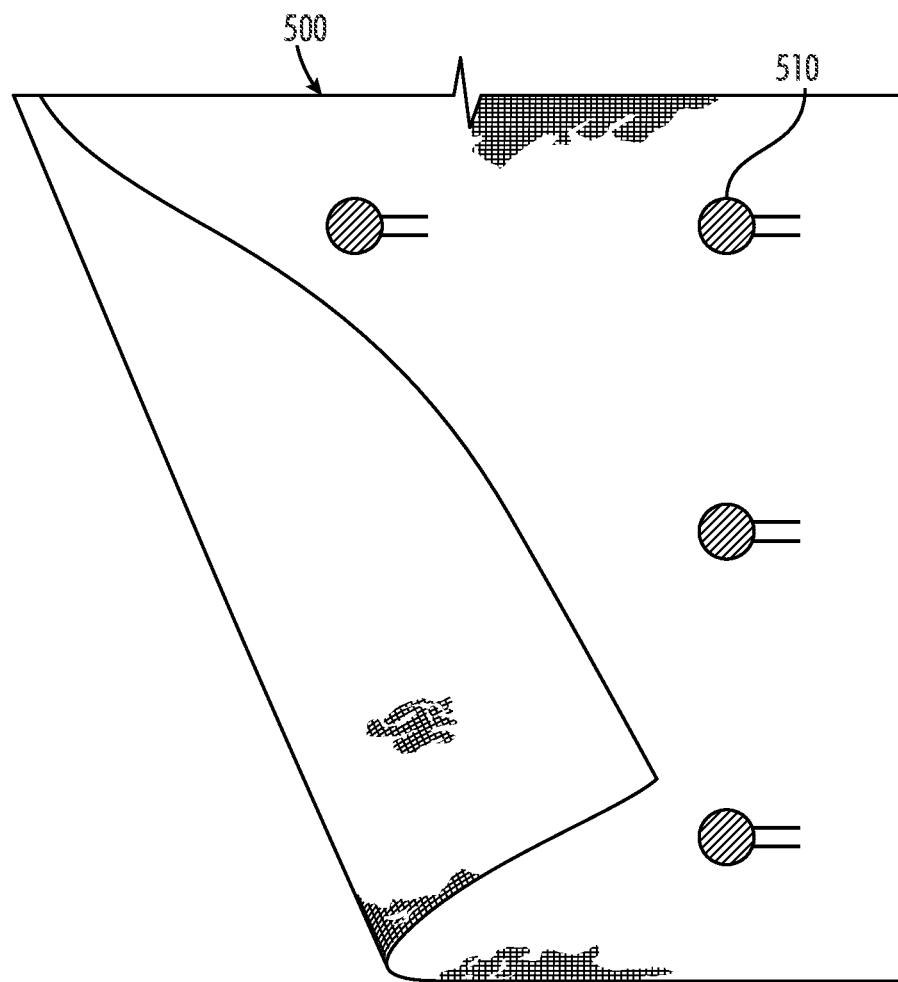
FIG. 5 illustrates an example of geofabric embedded with sensors.

FIG. 5 illustrates an example of a sensor enabled geofabric (500). Wherein a plurality of sensors (510) are configured with the geofabric. As discussed earlier, geofabrics are either woven or knitted, or a combination of both. In this example the sensors are integrated into the fabric, by adhering the sensor to the fabric using an adhesive. In other embodiments the sensors may be integrated into the fabric by knitting or weaving the sensor. In even further embodiments, the fabric itself may be the sensor with instrumentation for sensing embedded in the geofabric. In the present example of FIG. 5 the sensor enabled geofabric (510) may be configured with ribs or other instruments upon which to mount the strain gauge or flex sensor. In other embodiments the geofabric thickness may be increased as to allow for measurements using the various sensors and gauges.

Figure 6:
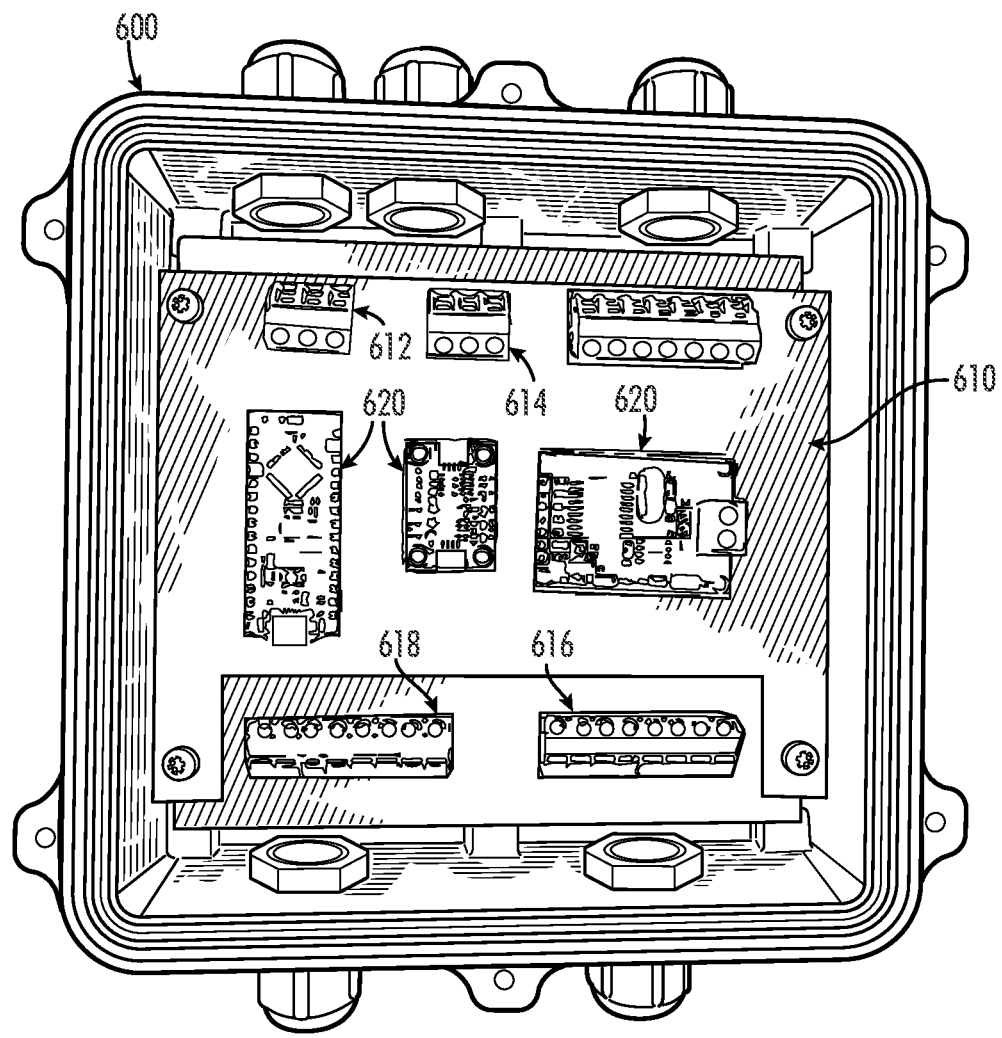
FIG. 6 illustrates an example of the internal components of a sensor pod.

Turning now to FIG. 6. An example of a sensor pod (600) is illustrated with the top protective cover removed. Visible is the printed circuit board (PCB) (610) along with various microcontrollers (620) that serve as signal collecting microcontrollers for the various sensors. In the example embodiment a temperature sensor input leads (612) are located at the top left of the diagram and serve as input to a temperature sensor. Moisture leads (614), and flex sensor leads (616), as well as strain gauge leads (618) are also visible in the example embodiment. In other examples only one sensor may be available, in others one or more, and in further the sensors are configured in special configurations for the application. For example, a moisture and strain gauge may be available in one aspect, and a moisture and temperature in another.

As previously discussed the various sensors and gauges operate to provide information or sensory data in which the microcontrollers (620) process and transmit through a communications adapter, either via wired or wireless protocol to a gateway node or receiver in which the information is then transmitted through a communications network to a computing network where the end user has access to a user interface to view the information in real time from the sensors. Often times a computing network consists of a web services platform as previously disclosed. Along the various steps in this example embodiment different algorithms may be applied to otherwise structure, filter, sort, alert, prepare, package, or otherwise convert the information received from the plurality of signals to instructions for computational processing.

In alternative embodiments of FIG. 6 the sensor pod (600) may also comprise the features of the gateway node or gateway receiver. Wherein the sensor pod is configured with a wired or wireless connection that typically will be a cellular connection to transmit the information or signals received from the one or more sensors. Further, the microcontroller may be equipped to compute the condition and/or health of the infrastructure and may send signals or alerts through a communication network to a computing network wherein an end user may receive the signal and send crews or workforce to investigate and/or repair the location in which the sensor detected a change in condition and/or health of the infrastructure.

Figure 7:
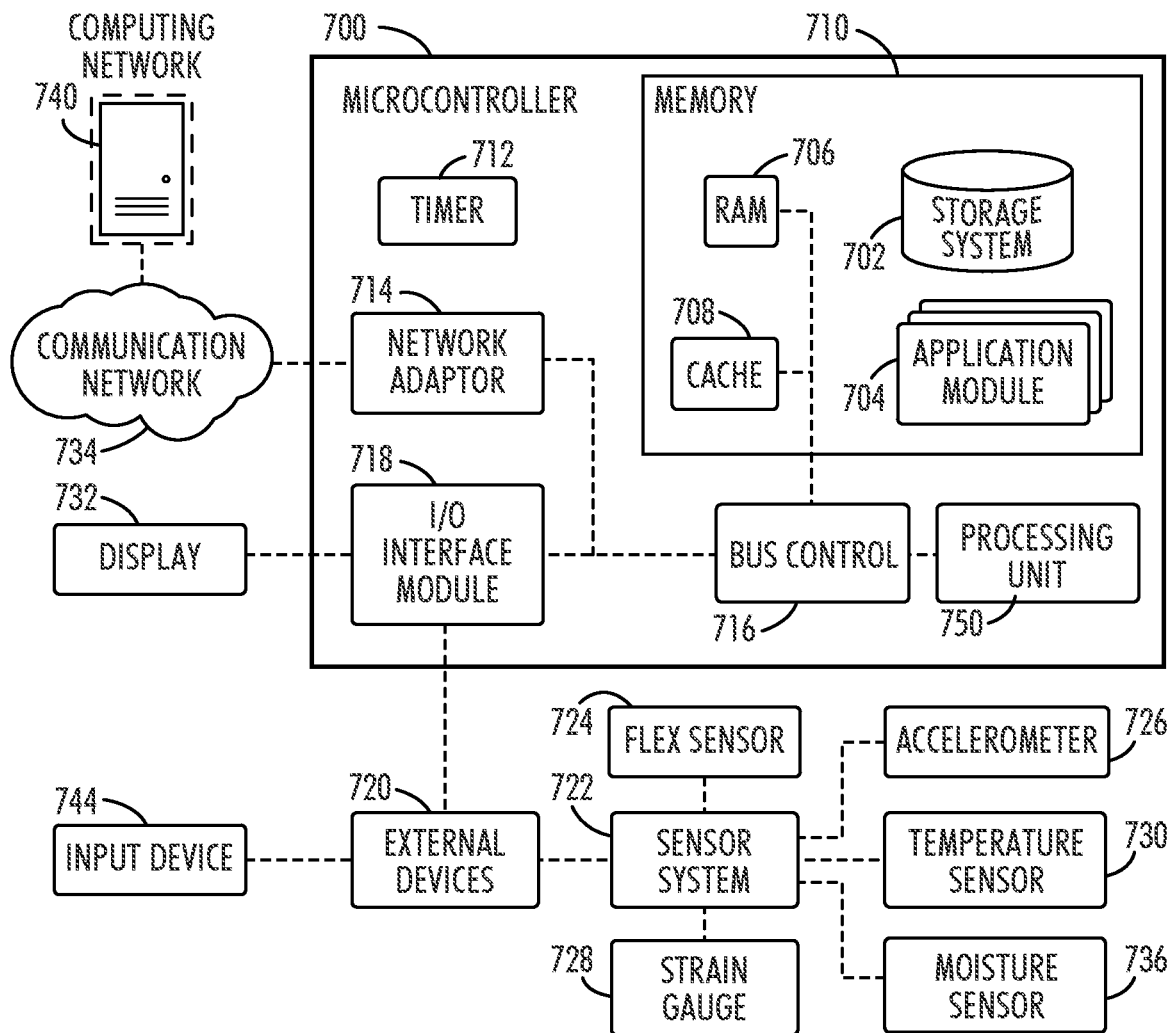
FIG. 7 is a component diagram of an example microcontroller configured for a sensor enabled geogrid.
Figure 9A:
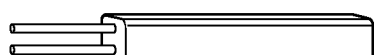
FIG. 9A is an illustration of an example flex gauge.
Figure 9B:
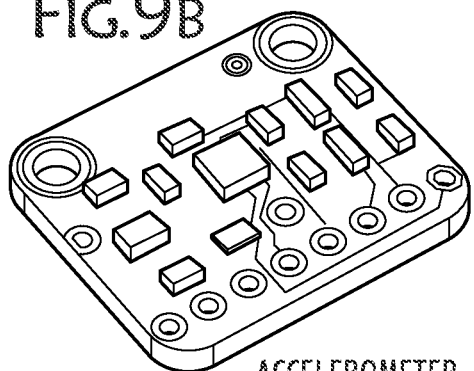
FIG. 9B is an illustration of an example accelerometer.
Figure 9C:
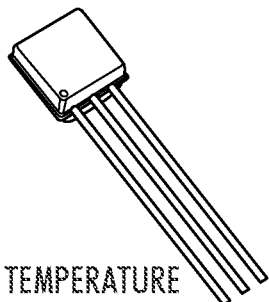
FIG. 9C is an illustration of an example temperature sensor.
Figure 9D:
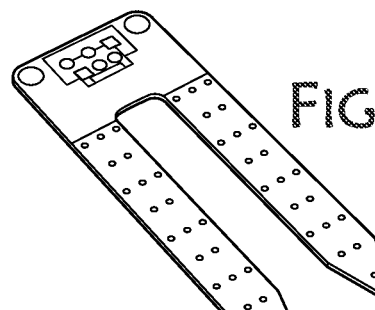
FIG. 9D is an illustration of an example moisture sensor.
Figure 9E:
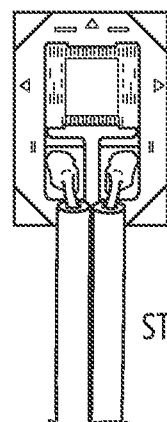
FIG. 9E is an illustration of an example strain gauge.

FIG. 7 is a component diagram of an example embodiment of a microcontroller for a sensor enabled geogrid. It is important to note that the embedded systems herein, such as the various microcontrollers may also be configured with general purpose computing, and vice versa. One of skill in the art will recognize the importance of a microcontroller for various aspects, as well as the replacement of a microcontroller with a general purpose computer for other aspects.

In the example embodiment of FIG. 7, the microcontroller (700) is comprised of several standard components, along with several unique I/O features. The microcontroller in other embodiments may be a general purpose computing device or a special purpose computing device, or any computing device capable of performing the disclosure herein. The microcontroller is equipped with a timer (712), which plays an important role in embedded systems by maintaining the operation cycle in sync with the system clock or an external networked clock. Further, the timer may be used in applications such as applications for generating time delays for battery conservation or to control sampling rates, etc. The microcontroller (700) is equipped with memory (710) in which contains a storage system (702) that is comprised of solid-state drive technology or may also be equipped with other hard drive technologies, including volatile and non-volatile memory for storage of computing information. For example, the infrastructure processing engine may host data tables or information in relational databases or in unstructured databases within the long term storage (702). The memory (710) of the example embodiment of a microcontroller (700) also contains random access memory (RAM) (706) which holds the program instructions along with a cache (708) for buffering the flow of instructions to the processing unit (750). In some aspects the infrastructure processing engine or other engine such as an engine for signal acquisition from the plurality of sensors will reside in RAM (706) as instructions are executed by the processing unit (750). Hence, data RAM is data space that is used temporarily for storing constant and variable values that are used by the microcontroller (700) during normal program execution by the processing unit (750) Similar to data RAM, special function registers may exist on the microcontroller (700), such special function registers operate similar to RAM registers allowing for both read and write. Where special function registers differ is that they may be dedicated to control on-chip hardware, outside of the processing unit (750).

Further depicted in the example of FIG. 7, an application module (704) is illustrated as it would be loaded into memory (710) of the microcontroller (700). Examples of typical application modules can be found in many consumer electronics, including toys, cameras, appliances, and the like. In our example, the application module (704) loads a sensing engine or a detecting engine within the sensor pod for acquiring signals from the sensor system (722) that is configured to the one or more sensors attached to the geogrid. Further, the sensor pod microcontroller (700) may load an engine for compiling the sensor information into a database, such as a relational database or an unstructured database. Similarly, the microcontroller (700) as disclosed within this example, may be located at the gateway node or node receiver and may perform similar or additional functions. Even further, the sensor pod configuration may also include the gateway configuration of hardware, such as cellular data service and additional processing engines, or vice versa.

In the example of FIG. 7, the processing unit (750) is configured to a system bus (716) that provides a pathway for digital signals to rapidly move data into the system and to the processing unit. A typical system bus (716) maintains control over three internal buses or pathways, namely a data bus, an address bus, and a control bus. The I/O interface module (718) can be any number of generic I/O, including programmed I/O, direct memory access, and channel I/O. Further, within programmed I/O it may be either port-mapped I/O or memory mapped I/O or any other protocol that can efficiently handle incoming information or signals from the one or more sensors. Configured to the I/O interface module (718) is external devices (720), wherein such devices may be an input device (744) such as a PDA, a tablet computer, a smartphone, or a laptop, in which may be plug and play with the microcontroller for diagnostics and information input, such as a firmware, BIOS, or software update. Further, the sensor system (722) in this example includes a flex sensor (724), an accelerometer (726), a strain gauge (728), a temperature sensor (730), and a moisture sensor (736). In other embodiments only one of the sensors may be present, in even further embodiments one or more of the sensors may be present. Additionally, the I/O interface is capable of interfacing with a universal serial bus (USB) or other type of I/O interface such as a controller area network (that may also be a part of the network adapter).

The microcontroller (700) in our example embodiment is further configured with a network adapter (714), in which the network adapter may support wired or wireless connections. The networking adapter supports a variety of transmission rates and some of the core functionality that Ethernet or wireless connections bring. The network adapter herein comprises both a wired Ethernet as well as a wireless or WiFi module. Further, in other aspects only an Ethernet module is part of the network adapter (714). In even further aspects the network adapter (714) may only comprise a WiFi module. The network adapter (714) is configured to communication with a communication network (734) that may start at a gateway node or gateway receiver and continue along several communication pathways to reach a computing network attributed to a program and user interface wherein an end user may view or otherwise visualize the current status, condition, and/or health of infrastructure. Including, but not limited to, building infrastructure, city infrastructure, road and pavement infrastructure, and rail and track infrastructure to name a few use cases.

Referring now to FIG. 8, wherein an example illustration of the IoT infrastructure system (800) of a sensor enabled geogrid is disclosed. The IoT infrastructure system (800) in this example is designed to acquire information from a sensor enabled geogrid, transport that information along a series of communication pathways within a communication network to a computing network, wherein an end user is able to access, manipulate, code, and utilize the data originating from the sensor enabled geogrid. We begin our discussion of FIG. 8 at the edge (825), wherein the edge (825) is an edge network that contains the sensor pod (810) and the gateway (820). The sensor pod (810) is configured to the sensor enabled geogrid (not pictured) and is in communication with a gateway (820), also known as a gateway node or gateway receiver. The gateway (820) is configured to communicate through wired or wireless means to a communications network (830). Typical communications network (830) equipment is illustrated such as a cell tower site (832) also known as a cell site or cellular base station. A cell tower site (832) is a cellular enabled mobile device site where antennas and electronic communications equipment are placed, typically on items such as a radio mast, tower, or other raised structure. The raised structure of a cell tower site (832) typically includes one or more sets of transmitter/receivers, digital signal processors, control electronics, microcontrollers, GPS receivers, and backup power sources, along with safety and cladding to protect the equipment. In the example of FIG. 8 the gateway (820) transmit cellular signals to the cell tower site (832) wherein the cell tower site (832) further transmits signals to a computing network (840) and ultimately to an end user or user interface. An application may be running on the computer network to display the health and/or condition from the received signals, or there may be a local general purpose computing device that receives information from the computing network and displays the information or processes the information for an end user.

Continuing in the example of FIG. 8, the communications network (830) may also comprise a small cell (834), wherein the small cell is a low powered cellular radio access node that operates in both licenses and unlicensed spectrum and can have a range of 10 meters to a few kilometers. Small cells are important on certain edge (825) applications in which the distance to a cell tower (832) may be far. Further, small cells are particularly important for cellular bandwidth as signal density increases, the unlicensed spectrum may reduce loads and provide efficiency within networked areas. Further, in our example embodiment a distributed antenna system (DAS) (836) may be a part of the communications network (830). In a DAS a network of spatially separated antennae nodes are connected to a common source to transport wireless service within a sample geographic area or structure. A DAS may be utilized in embodiments of the present disclosure wherein building infrastructure or city infrastructure is concerned. FIG. 8 is not a comprehensive view of the IoT platform or the communications network (840), many other technologies may be utilized such as wired, coaxial, or fiber optic transmission. Further, embodiments such as satellite and microwave transmission, along with standard RF may comprise any aspect of the disclosure as will be known by those of skill in the art.

Turning now to FIG. 9, wherein an example of a plurality of sensors that are applicable to the current disclosure are highlighted. In addition, the example sensors herein, other sensors such as pressure sensors, humidity sensors, UV radiation sensors, and lightning detectors are also applicable. In FIG. 9A an example of a flex sensor is illustrated. A flex sensor or bend sensor is designed to measure the amount of deflection or bending. Typical flex sensors resemble variable resistors that varies the amount of resistance upon bending. The construction of a flex sensor often includes a phenolic resin substrate, upon which a conductive ink is placed and segmented semiconductors are placed along the conductive ink pathway. Additional embodiments of flex sensors exist and the principles remain the same. In FIG. 9B an example of an accelerometer is disclosed. An accelerometer is a tool that measures the rate of change of velocity of a body at its own instantaneous rest frame. This type of acceleration differs from directional acceleration in a fixed coordinate system. The disclosure herein includes the use of multiple accelerometers for coordination with one another and in measuring the difference between one another. For example, one accelerometer may be placed on one rail track and on the opposite rail track an additional accelerometer. Similarly, within the IoT system the accelerometers may be coordinated across the sensor enabled geogrid to form a "map" or a look at the entire system, even aiding in tracking movements along the system. In FIG. 9C an example of temperature sensor is disclosed. In the example a resistance thermometer is disclosed, wherein a length of fine wire is wrapped around a ceramic core or glass, and the wire measures the resistance/temperature relationship. Other temperature sensors are applicable, including infrared, mercury, digital, and more. In FIG. 9D an example of a moisture sensor is illustrated. In the example illustration the two exposed pads serve as probes, acting as a variable resistor. The more water within the substrate, layer, or soil the better the conductivity between the two pads, thus lowering resistance. Additional embodiments of moisture sensors are available and the disclosure is but one sample among a plethora of moisture sensors available for commercial purchase. In FIG. 9E an example of a strain gauge is illustrated. As discussed previously, a strain gauge measures the stress or strain on materials. When a force is applied to the body of the strain gauge, the body deforms, this deformation is called strain. More specifically, strain (E) is defined as the fractional change in length with the following equation:

$$\varepsilon = \frac{\Delta L}{L}.$$

Another type of strain is shearing strain, which is a measure of angular distortion. Shearing strain is directly measureable by a phenomenon known as Poisson strain.

$$\text{Poisson's strain} = -\varepsilon \frac{t}{\varepsilon_1}.$$

Further, there are two types of stress, normal stress or loading applied to a material and its ability to carry the load, and shear stress where it is parallel to the plane of normal stress. Both configurations are available in the present disclosure, and in the example embodiments we will see a combination of one or more strain gauges used to detect strain and sheer in multiple planes.

Figure 10:
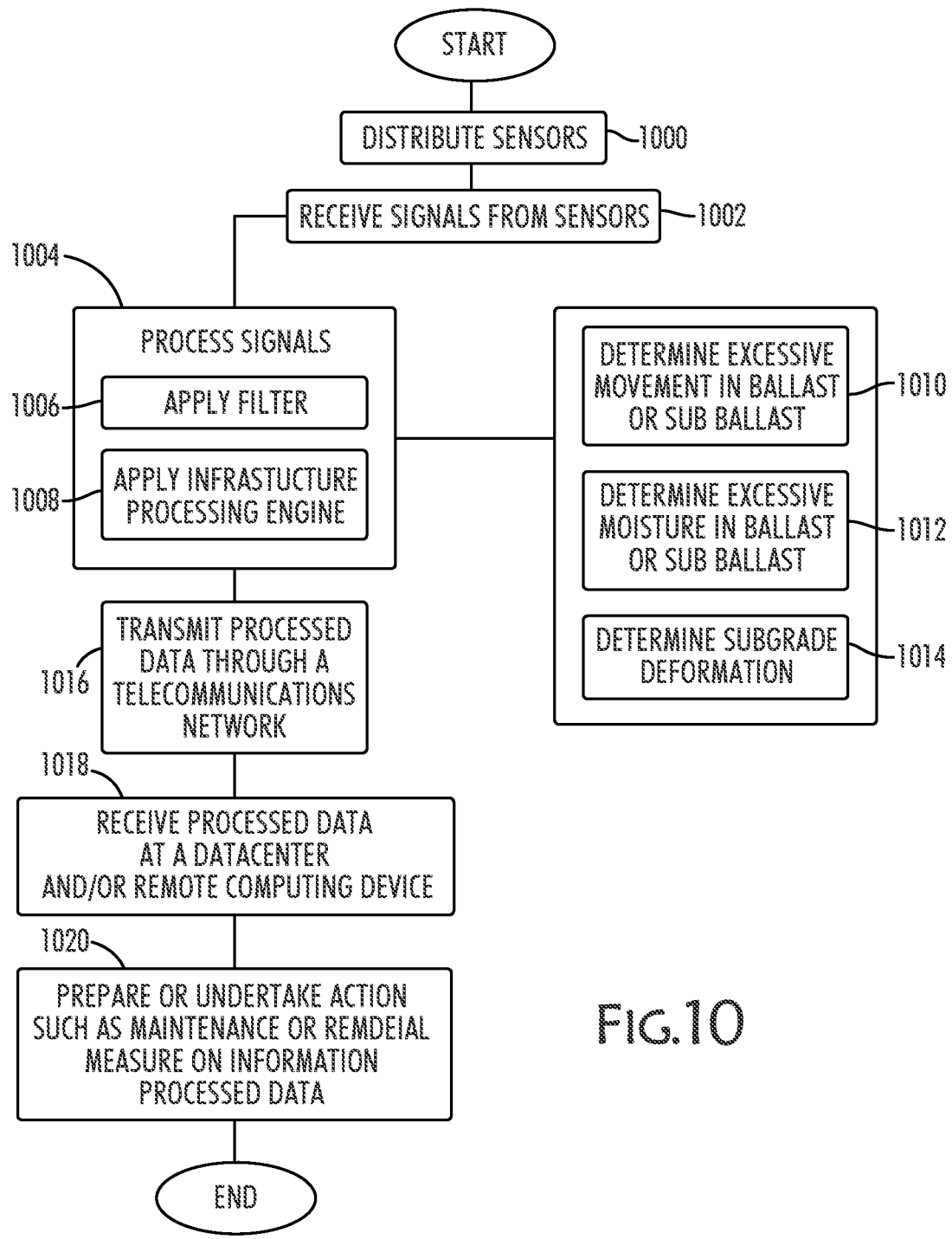
FIG. 10 is a flow diagram of an example of a method for monitoring the condition and/or health of infrastructure.

Turning now to FIG. 10, wherein a flow diagram is provided of an example of a method for monitoring the condition and/or health of infrastructure. In the example method we begin by distributing sensors (1000), typically in a sensor enabled geogrid, geofabric (or other geocomposites), however, additional embodiments such as distributing sensors within the infrastructure layers not attached to a geogrid is also disclosed. Further, the type and count of sensor is dependent upon the particular use case. In one example, one or more sensors, even of the same type of sensor (e.g. multiple strain gauges), are utilized in an array that provides for the most accurate reading possible for a given infrastructure. Continuing, in our example, we receive the signals from the distributed sensors (1002), typically by a sensor pod or gateway that is at the edge of the IoT network and serves as a collecting and storage device before transmitting the signals or information along the communication pathway. Next, in one embodiment, we process the signals (1004) or information from the sensors. In one embodiment this is done at the sensor pod, in another embodiment this is done at the gateway node or gateway receiver, and in another embodiment this is done at the computing network or general purpose computer near the end user. The process signals (1004) operation, as mentioned can occur at any computing aspect within the system or at multiple points within the system. In one aspect the sensor pod may process signals (1004) and apply a filter (1006) wherein a filter removes noise or extraneous information received from the one or more sensors. In another aspect the sensor pod may process signals (1004) and forward the signals on to the gateway node or the computing network for applying a filter (1006). In other embodiments independent components analysis may occur to isolate signals, in other embodiments a principle components analysis may be done to further refine the signals. It is important to note that many algorithms are used to filter signals and/or clean up the data received from the sensors, in this example we discuss a few well known methods, but other methods are applicable that allow the sensors to produce intelligible readings and information. Next, and along with processing signals (1004) the sensor pod, the gateway, or the computing network may apply an infrastructure processing engine (1008) to the data received from the one or more sensors. The infrastructure processing engine, in this example, processes the data received from the sensors and produces information that an end user can act upon. This may be in the form of an alert, a message, a notification, or otherwise process the data that produces an indication if one or more sensors has exceeded specific thresholds. For example, if the moisture sensor displays higher than average conductivity and the strain gauge is showing increasing strain or electrical resistance above a moving day average of the strain gauge. Further, other sensors may be used to verify the veracity of the data, such as an accelerometer, for example a train passing on tracks or a car on pavement may cause the strain gauge to temporarily increase before returning to normal resistance, the accelerometer mounted on the tracks may detect a train passing and aid in filtering or the processing engine in interpreting the data.

Continuing the discussion with a recitation of steps and methods of the example infrastructure processing engine (1008) of FIG. 10. Wherein the infrastructure processing engine (1008) determines through the one or more sensors whether there is excessive movement in the ballast or sub ballast (1010). Next, the second parameter is acquired by the infrastructure processing engine (1008), wherein it determines if excessive moisture is in the ballast and/or sub ballast of infrastructure (1012). Lastly, the infrastructure processing engine (1008) uses the first two parameters to determine the magnitude of subgrade deformation (1014) and whether or not the condition and/or health of the infrastructure should be investigated (1020). Now following the processing of signals (1004), the processed signals are transmitted through a telecommunications network (1016) to a computing network, wherein the computing network receives the signals (1018) and may perform additional processing or apply an infrastructure processing engine (1008) or other similar engine to the information received from the sensors. In other aspects the application of filtering the signals and infrastructure processing occurs at the computing network away from the edge of the IoT platform. In other aspects the filtering and processing occurs at the gateway node or within the sensor pod itself. Throughout the various examples the result is information on the health and/or condition of infrastructure or status of the various infrastructure without requiring field agents or needing to physically inspect the infrastructure. The disclosure herein provides intelligence throughout the system and allows a sensor enabled grid to communicate actionable information to an end user who can take action on the particular piece of infrastructure based on the actionable information.

Figure 11:
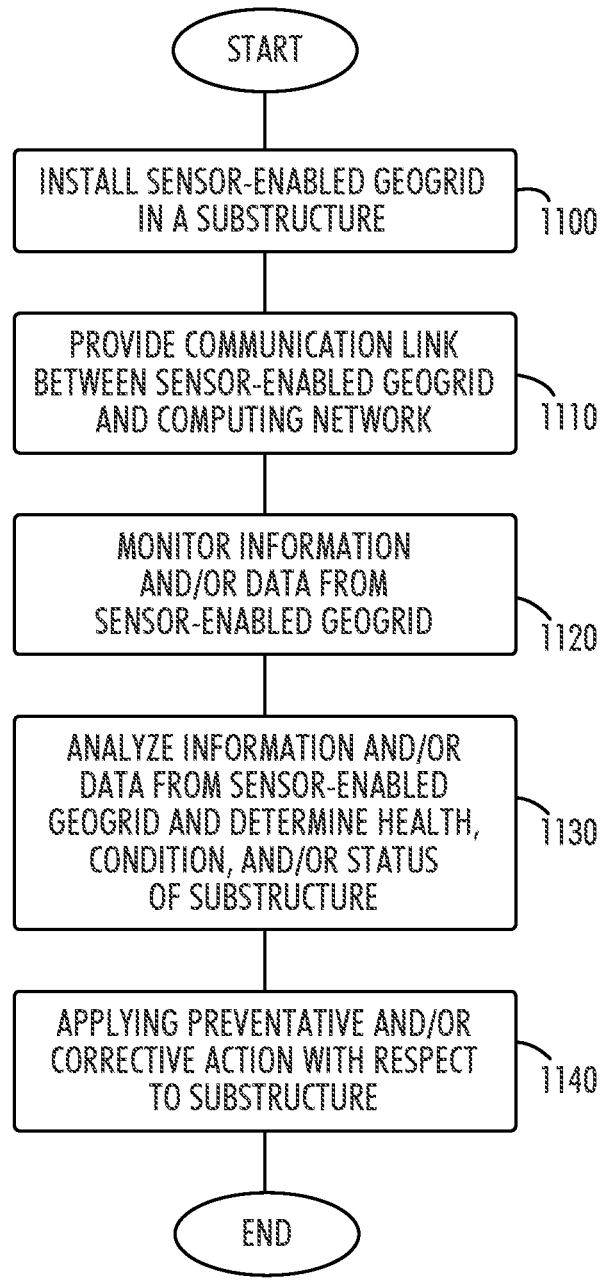
FIG. 11 is a flow diagram of an example of a method for monitoring the condition and/or health of infrastructure.

Turning now to FIG. 11, a flow diagram of an example of a method for monitoring the condition and/or health of infrastructure. In this example a sensor enabled geogrid is first installed in a substructure of infrastructure (1100). A substructure may be any structure of infrastructure that falls below the main surface structure, such as a surface course. Examples of substructures include, but are not limited to, a ballast, a sub ballast, a binder, a base course, a subbase course, a compacted subgrade, and a natural subgrade. Following installation, a network communication is established linking the sensor enabled geogrid to a computing network (1110). This may be done through a sensor pod attached or configured to the sensor enabled geogrid, or through a gateway or gateway node/receiver attached to a geogrid and further configured through wired or wireless means to a communications network. Next, the information or data from the sensor enabled grid is monitored by the computing network (1120). Monitoring includes analyzing the information and/or data from the sensor enabled geogrid to determine the health, condition and/or status of the infrastructure, and also in particular areas of substructure (1130). Lastly, from the information gathered from the sensor enabled geogrid, applying preventative and/or corrective measures or action to the respective substructure (1140).

Figure 12:
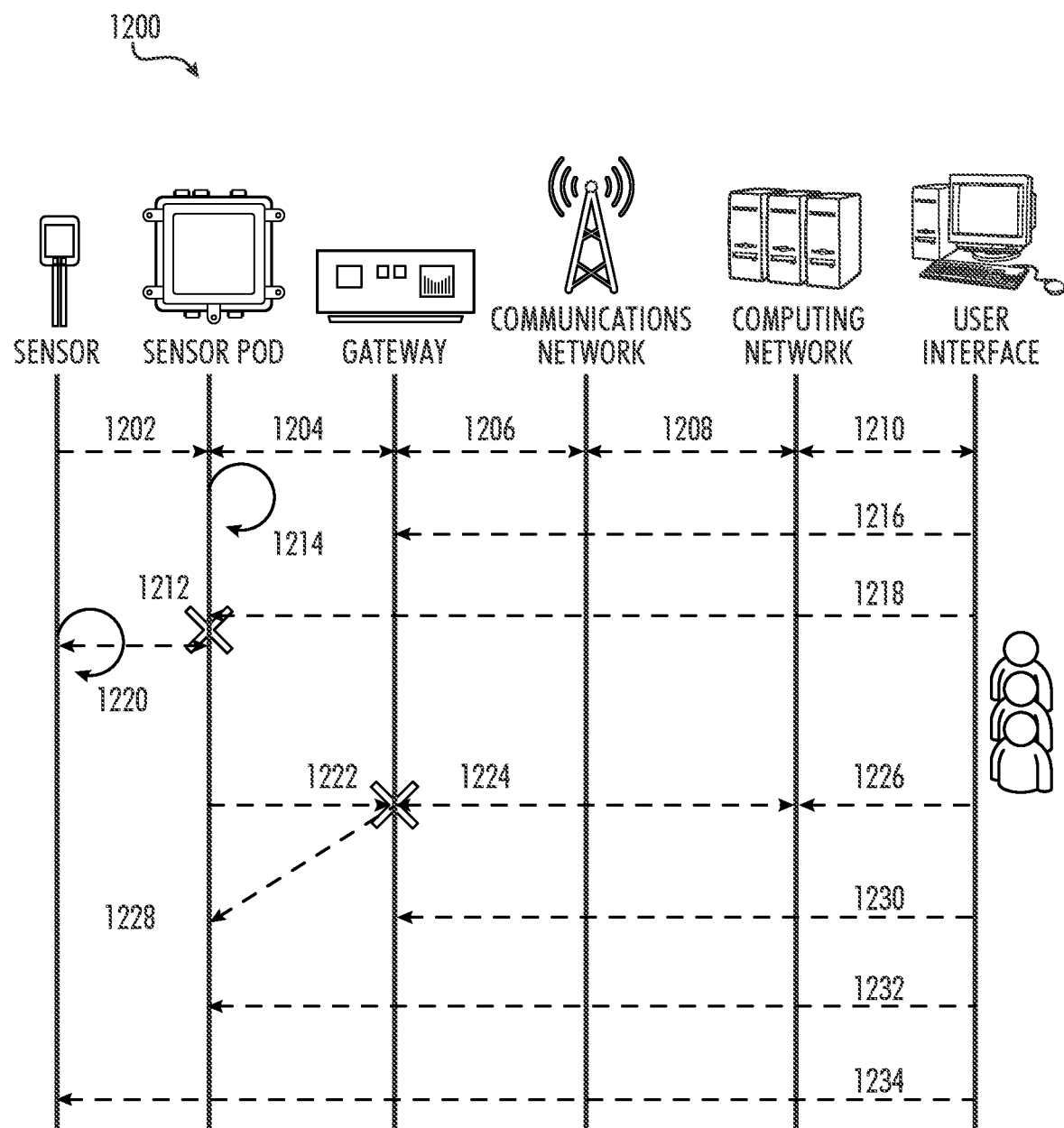
FIG. 12 is a sequence diagram of an example of a method for monitoring the condition and/or health of infrastructure.

In FIG. 12 a sequence diagram of an example of a method for monitoring the condition and/or health of infrastructure (1200) is illustrated. Sensors generate a signal (1202), often times a time series data format (1214), by sampling in a linear fashion, in other embodiments data may be sampled randomly or by algorithmic means. Next, the sensor pod receives and may also convert/interpret (1204) the signals in the event that an analog to digital conversion is necessary. Next, the sensor pod transmits the signal information or data to the gateway, in which the gateway transmits the information along a communication network (1206). The communication network (1206) transmits the information and/or data from the sensors and from the gateway to the computing network (1208). Wherein the computing network analyzes (1210) the information or data and displays the information or data on a user interface. In the example embodiment, disclosure for transmitting programmable instructions (1216) from an input device on a user computer or user interface connected to a computing network to a gateway or a sensor pod is disclosed. In such embodiments the user may provide updates to the software or applications, examples include firmware or sensor updates, or updates to the processing engine(s) via the communications network to the various edge hardware devices (sensors, sensor pod, gateway).

Continuing with FIG. 12, in the event no signal (1212) is received from the sensors the sensor pod will continue to attempt to capture a signal (1220) Similarly, in the event the gateway does not receive a signal (1222) the gateway may alert the computing network so that the sensor pod and or sensors may be investigated. Additionally, if the gateway is not receiving communications from either the sensor pod or the communications network it may cache the data or otherwise store it until communications resume (1224). Similarly, the sensor pod may also undergo the same procedure if it loses connection to the gateway, it may cache or otherwise store the signal information from the one or more sensors. In the example embodiment, teams or crews may be dispensed to investigate the gateway (1230), or the sensor pod (1232), or the sensors (1234) based on the built in procedures and protocols within the system of providing alerts at key areas where a loss in communication may result in a loss of service or information.

Figure 13A:
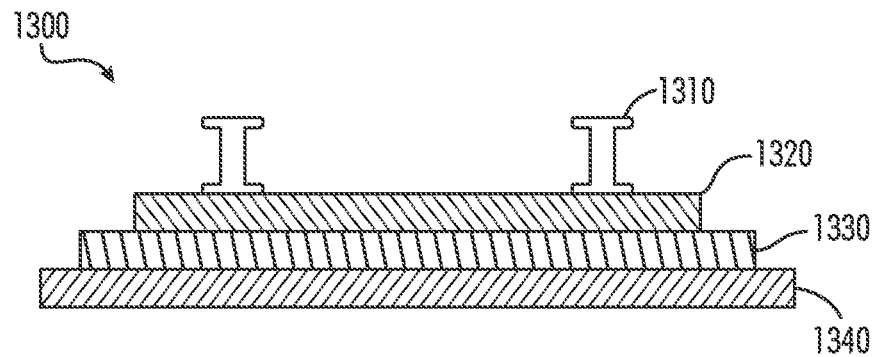
FIG. 13A is an illustration of an example of rail track infrastructure.
Figure 13B:
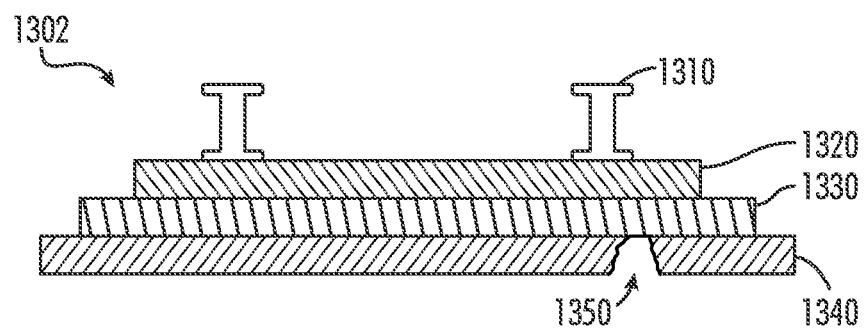
FIG. 13B is an illustration of an example of rail track infrastructure with a change in condition and/or health of the rail track infrastructure.

Shifting focus to rail track and infrastructure embodiments. In FIG. 13A an example embodiment of rail track infrastructure is illustrated. The various layers or substrate defined herein are for example, and in practice the layers may be defined differently or difficult to determine. Additional elements of rail track infrastructure may contain a ballast shoulder, a cess, sleepers, a blanket, and other layers and or elements. Further, many of the layers may be repeated and/or comprise a variety of additional elements, the focus remains on monitoring the substrate through a sensor enabled geogrid, and the examples here are but a few configurations that are encompassed by the disclosure. The rail track infrastructure (1300) illustrates rail tracks (1310) as well as a ballast layer (1320), a sub ballast layer (1330), and a sub grade layer (1340). Together the layers form one embodiment of rail track infrastructure that illustrates the rail track infrastructure (1300) in good health and condition. In FIG. 13B an example of a washout condition or erosion or damage (1350) in a rail track infrastructure is illustrated (1302). More particularly, the washout condition or erosion or damage to the rail track infrastructure has occurred in the subgrade (1340). Erosion or a washout typically occurs when soft soil or other layers break down due to water or mechanical forces, often times during a heavy downpour, a flash flood, or a flooding body of water. Mountainous regions, and regions lacking vegetation to fortify the sediment may experience additional washout or erosion conditions. A washout condition in rail and track infrastructure can be difficult to locate and may even leave the rail suspended above the ground, increasing the chances of a potential accident. Therefore, the sensor enabled geogrid, as disclosed herein, is equipped to detect even minor changes in the rail track infrastructure, changes that may not be known by visual inspection, and to analyze those changes for lifecycle maintenance, repair, and/or mediation.

Figure 14A:
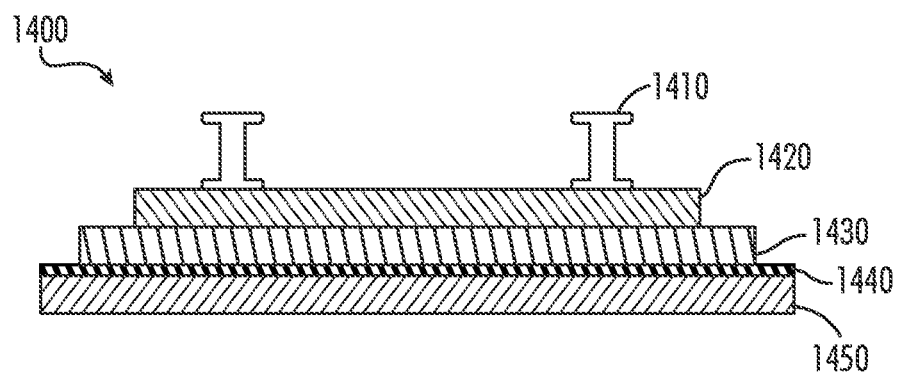
FIG. 14A is an illustration of an example of rail track infrastructure with a sensor enabled geogrid installed above the subgrade.
Figure 14B:
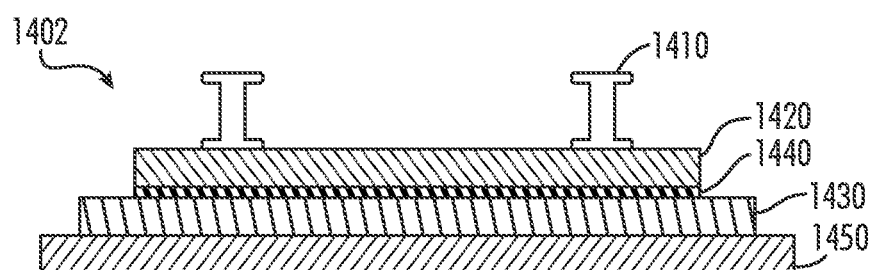
FIG. 14B is an illustration of an example of rail track infrastructure with a sensor enabled geogrid installed above the sub-ballast.

In FIG. 14A-B an example of rail track infrastructure with a sensor enabled geogrid is illustrated (1400, 1402). In FIG. 14A the sensor enabled geogrid (1440) is placed above the subgrade level (1450). In FIG. 14B the sensor enabled geogrid (1440) is placed above the sub ballast level (1430). The placement of the sensor enabled geogrid (1440) within the infrastructure is dependent upon the structure of the rail and track infrastructure as well as the particular application. In other aspects a plurality of sensor enabled geogrids, or a sensor enabled geogrid and a sensor enabled geofabric, or in even other cases a geogrid and a sensor enabled geofabric, are combined to form a "sensing layer." A sensing layer is a layer with one or more sensors on the geogrid or geofabric that receive information about the rail track infrastructure and transmit the received information to a computing network away from the IoT edge for further processing and monitoring. Similarly, to the previous diagrams, the rail tracks (1410) are placed on ballast material (1420). Ballast material (1420) holds the track in place and typically consists of crushed stone, although other, less suitable materials may be used such as burnt clay. The appropriate thickness of a rail track ballast depends on the size and spacing of the ties (not shown), the amount of traffic, and various other factors such as the geogrid supported infrastructure or sublayers. The sub ballast (1430) is typically smaller crushed stones than that of the ballast (1420), and is designed to support the ballast (1420) and reduce the ingress of water from the underlying support structures. The sensor enabled geogrid (1440), in this example, equipped with a moisture sensor and a strain gauge and or flex gauge may anticipate fouling from water ingress in the substructure. The moisture sensor may be equipped to sense on a time series basis, wherein the computing network and an application module may have the seasonal averages or swings and use previous information to build or develop a model for the particular region and/or location of rail track infrastructure.

Figure 15A:
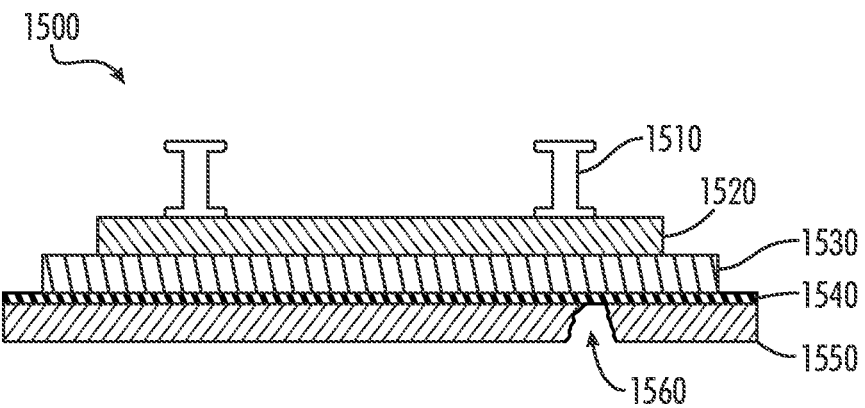
FIG. 15A is an illustration of an example of rail track infrastructure with a sensor enabled geogrid installed and a change in the condition and/or health of the rail track infrastructure in the subgrade.
Figure 15B:
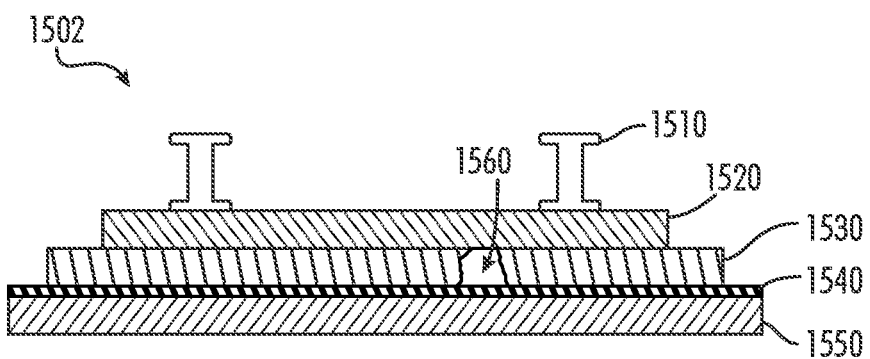
FIG. 15B is an illustration of an example of rail track infrastructure with a sensor enabled geogrid installed and a change in the condition and/or health of the rail track infrastructure in the sub-ballast.

In FIG. 15A-B a sensor enabled geogrid rail track infrastructure with a washout condition is illustrated. In FIG. 15A the washout condition or erosion or damage has occurred within the subgrade layer (1550). A subgrade (1550) is typically the native material wherein the infrastructure is placed. The subgrade (1550) may be compressed or mixed with other aggregate to fortify if the native material is not capable of supporting the application. In FIG. 15B erosion or washout or damage has occurred at the sub ballast layer (1530). The location of where the erosion occurs is one example of how the sensor enabled geogrid performs using the one or more sensors. For example, in the embodiment of FIG. 15A the sensor enabled geogrid (1540) may experience strain from the missing sub grade layer (1560), wherein the strain gauge sensor will highlight added resistance, further, if equipped with a flex sensor, the flex sensor may also verify increased flex on the geogrid due to the washout condition. The washout in FIG. 15A, in one example, may produce a concave bend in the geogrid due to the loss of subgrade, the concave bend will increase readings on the flex sensor and produce signals alerting of changes in the health and or condition of the rail track infrastructure. In other embodiments, the concave bend in FIG. 15A may produce resistance in a strain gauge and produce signals depicting the strain on the sensor enabled geogrid. One skilled in the art will immediately recognize the benefits of imparting intelligence to rail track infrastructure, further the cost savings and casualty avoidance increase the need for such an application as disclosed herein. In FIG. 15B the washout condition or erosion or damage (1560) may remove pressure or forces on the top of the geogrid, it may even cause a convex bend, wherein the strain gauge and the flex sensor may alert to such forces on the sensor enabled geogrid (1540). Additionally, the moisture sensor may indicate an increase in moisture due to a washout and further indicate the health and or condition of the rail track infrastructure.

Figure 16A:
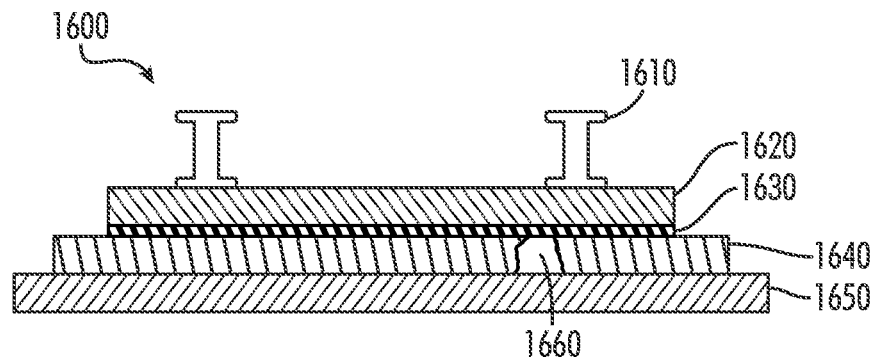
FIG. 16A is an illustration of an example of rail track infrastructure with a sensor enabled geogrid installed and a change in the condition and/or health of the rail track infrastructure in the sub-ballast.
Figure 16B:
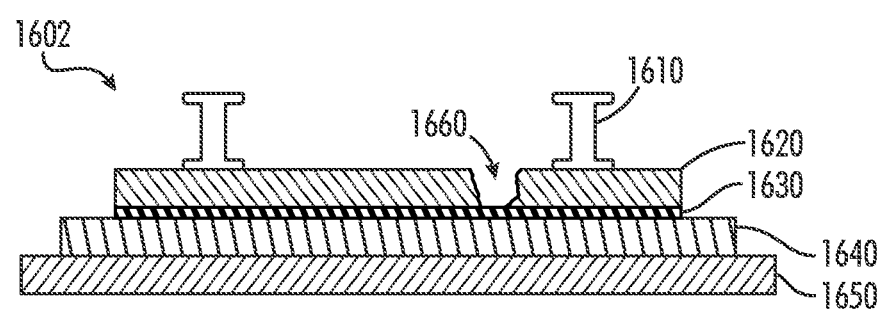
FIG. 16B is an illustration of an example of rail track infrastructure with a sensor enabled geogrid installed and a change in the condition and/or health of the rail track infrastructure in the ballast.

Similarly, in FIGS. 16A-B additional washout or erosion or damage (1660) to a sensor enabled rail track (1630) is illustrated. The rail tracks (1610) are held in place by the ballast (1620), whereby, in the example of FIG. 16A the sensor enabled geogrid (1630) is placed. In this embodiment the sensor enabled geogrid (1630) is placed above a sub ballast and depicts the use of utilizing the "sensing layer" that is the sensor enabled geogrid at multiple locations in the rail and track infrastructure. Similar to FIGS. 15A-B the washout conditions or erosion or damage may occur at various points across the rail track infrastructure. The geogrids semi rigid structure allows forces and changes to be felt throughout in a "web" like fashion so that even though the sensors are not placed directly at a point of erosion, they will nonetheless detect or sense changes in the infrastructure. In FIG. 16A the washout (1660) occurs at the sub ballast layer causing a concave formation of forces on the sensor enabled geogrid. These forces may be detected by the one or more sensors and transmitted from the edge hardware to a computing network, wherein an end user (via a software application or platform) may take preventative or remedial measures or alert to a change in the health and condition of the rail track infrastructure.

Figure 17A:
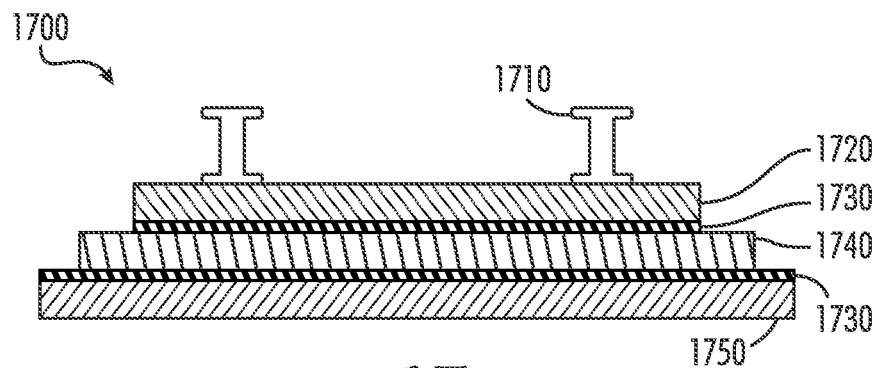
FIG. 17A is an illustration of an example of rail track infrastructure with sensor enabled geogrids installed at multiple layers of the rail track infrastructure.

In FIG. 17A a plurality of sensor enabled geogrids (1730) are placed in a rail track infrastructure. The rail track rails (1710) are held by the ballast (1720), wherein the first sensor enabled geogrid (1730) is placed, followed by a sub ballast (1740) and a second sensor enabled geogrid (1730), that is positioned above the subgrade. In this example, multiple sensor enabled geogrids increase the sensitivity of readings and allow for additional data and redundancy. Further, such an arrangement may be beneficial for areas of great importance, such as at the rail track station where increased and repetitive stresses may fatigue infrastructure more rapidly.

Figure 17B:
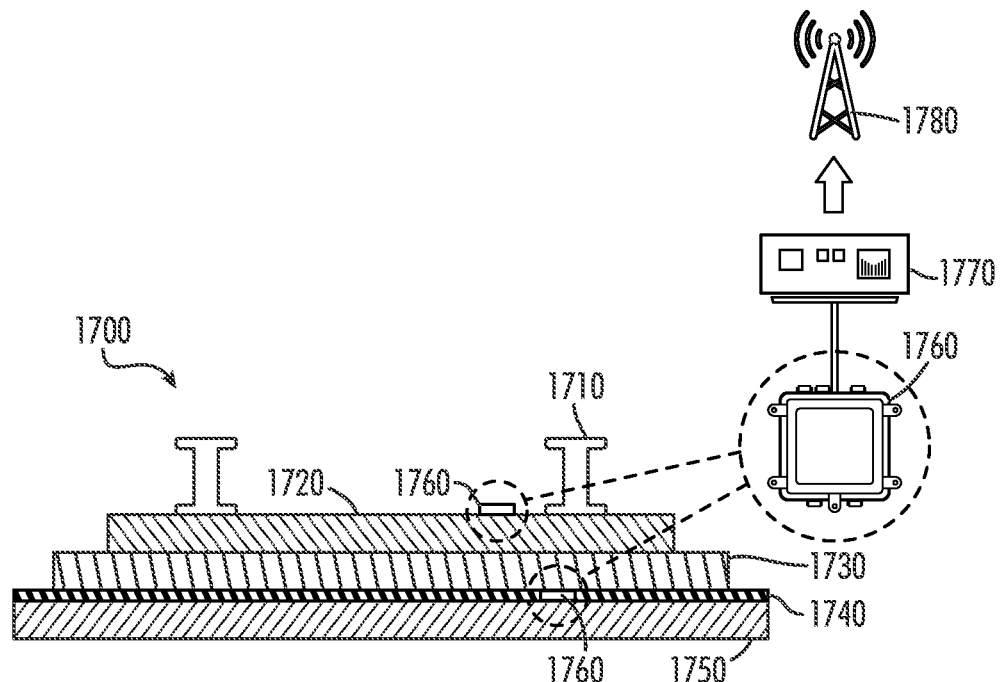
FIG. 17B is an illustration of an example of rail track infrastructure with a sensor on the rail tie, a sensor pod, and a gateway.

In FIG. 17B an example of edge infrastructure is illustrated for a sensor enabled geogrid in rail and track infrastructure (1702). The rail track rails (1710) are positioned on top of the ballast (1720), wherein in the example embodiment depicts multiple locations of a sensor pod (1760). The sensor pod (1760) may rest on the railroad ties or upper infrastructure for ease of access and communication. Further, as seen in other embodiments and disclosures herein (FIG. 4) the sensor pod (1760) may also be configured to the sensor enabled geogrid (1740) itself. The location of the sensor pod (1760) will vary with rail track installation, however, in additional examples the sensor enabled geogrid is fabricated with the sensors and the sensor pod to allow rapid installation. The gateway node (1770) or gateway receiver is configured with a direct connection, such as Ethernet or data cable or coaxial cable to the sensor pod. The gateway node (1770) or gateway receiver is equipped to transmit both wired or wirelessly to the communication network (1780), wherein the sensor information is forwarded to a computing network for further monitoring and analysis.

Figure 18A:
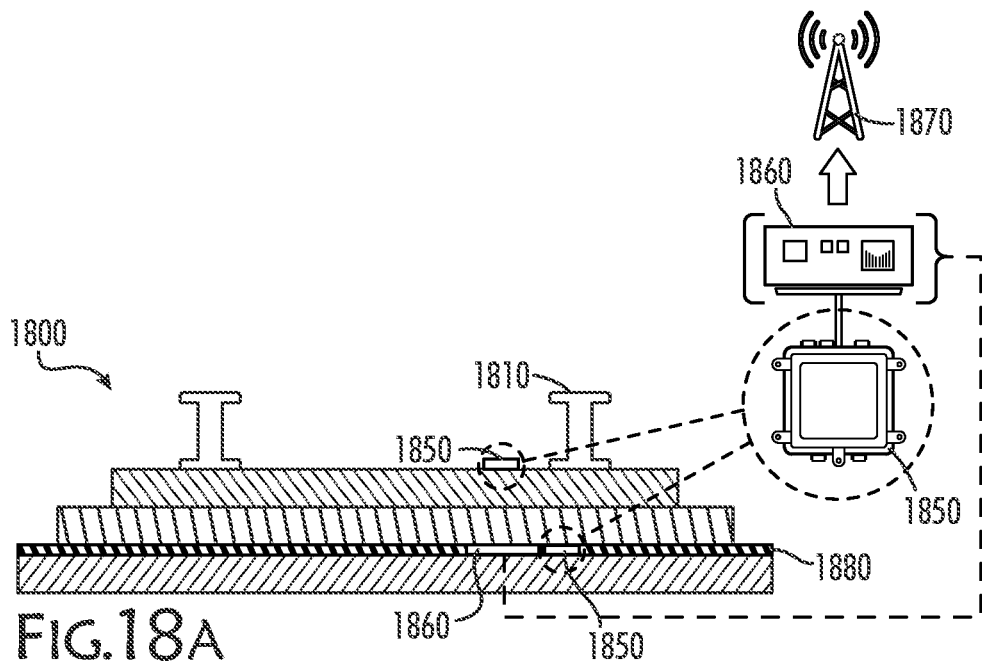
FIG. 18A is an illustration of another configuration of an example of rail track infrastructure with a sensor on the rail tie, a sensor pod, and a gateway.

In FIG. 18A the sensor pod (1850) is depicted as being replaced by the gateway node (1860), wherein the gateway node (1860) provides input and protection of the leads and configuration for receiving information from the sensors. In this example the gateway and the sensor pod are capable of being combined, wherein the sensor pod may have the attributes of the gateway, thus the sensor pod may be equipped to communicate over cellular transmission to a communication network. The edge system may be broken down into further constituents as well. In additional examples the gateway receiver may have one wired receiver from the sensor pod and a wireless receiver from the wired receiver. In the previous example a daisy chain of gateway receivers may be constructed to provide the transmission of information from the sensors to the communication network.

Figure 18B:
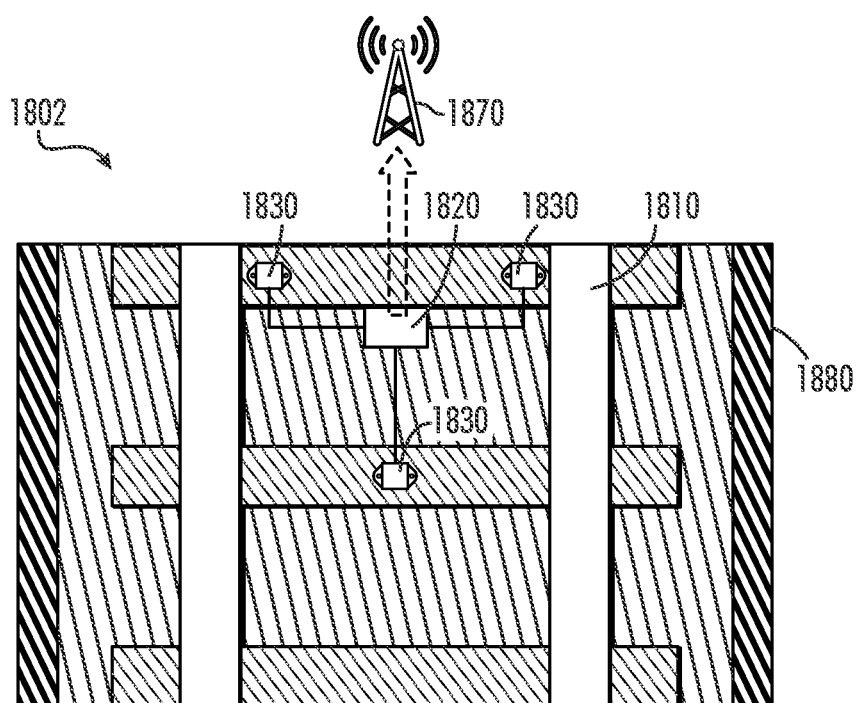
FIG. 18B is an illustration of an elevational view of sensor configuration on a sensor enabled geogrid on rail track infrastructure.

In FIG. 18B an elevational view of a sensor enabled rail track infrastructure is illustrated. The sensors (1830) may include an accelerometer on the rail track tie that allows detection of vibrations on the track, wherein the detection of vibrations may allow for filtering as the train passes, therefore filtering out erroneous strain or flex. In this embodiment the systems may cross reference one another and part of the infrastructure processing engine may use one sensor to clean up or filter the data of another sensor. The sensor pod (1820) is depicted on top of the ballast, facilitating access to the enclosure for upgrades and equipment verification. Further, in the present embodiment the top of the sensor pod may be equipped with solar infrastructure for powering a rechargeable battery that powers the sensors and microcontroller equipped in the sensor pod (1820). In additional embodiments, mechanical forces or vibrations in the rail track may provide piezoelectric charge that provides charge to the battery powering the sensor pod microcontroller and sensors. In additional aspects, for instance on electric driven trains and rail, the sensor pod may tap directly into the grid to receive power. In further aspects the batteries are equipped to last a lifetime of the sensor pod unit, wherein the replacement time would replace the entire unit. Further, in FIG. 18B the sensor pod (1820) is equipped with cellular communications that allow transmission to the communication network (1830), wherein the data from the sensors is sent to the computing network.

Figure 19:
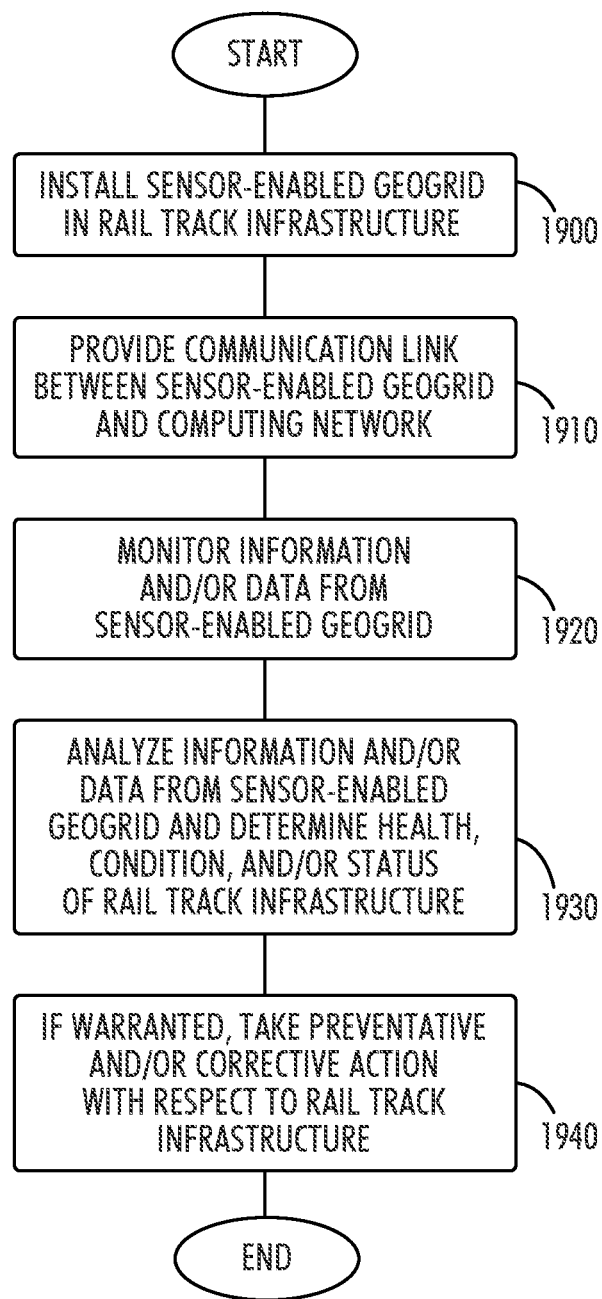
FIG. 19 is a flow diagram of an example of a method for monitoring the condition and/or health of rail track infrastructure.

In FIG. 19 a flow diagram illustrates an example of a method for monitoring the condition and/or health of rail track infrastructure. In one aspect, an installation of a sensor enabled geogrid is placed within rail track infrastructure (1900). The sensor enabled geogrid as part of the rail track infrastructure is imparted with intelligence in the form of one or more sensors and a sensor pod or gateway to receive the signals produced from the one or more sensors. Next, a communication link is provided between sensor enabled geogrid in the rail track infrastructure and a backend computing network (1910). Next, users and the systems herein monitor the information (1920) received from the sensor enabled geogrid. In monitoring the program or user analyzes the information and/or data from the sensor enabled geogrid and determines the health, condition, and/or status of the rail track infrastructure (1930). Sometimes, further discovery is needed and the analyzation process may direct to additional information gathering. Lastly, if warranted, preventative and/or corrective action may take place on the rail track infrastructure (1940), including remedying a washout out or erosion condition. Further, in additional embodiments, lifecycle maintenance of the rail track infrastructure may be guided by or dictated by the information from the sensor enabled geogrid.

Figure 20:
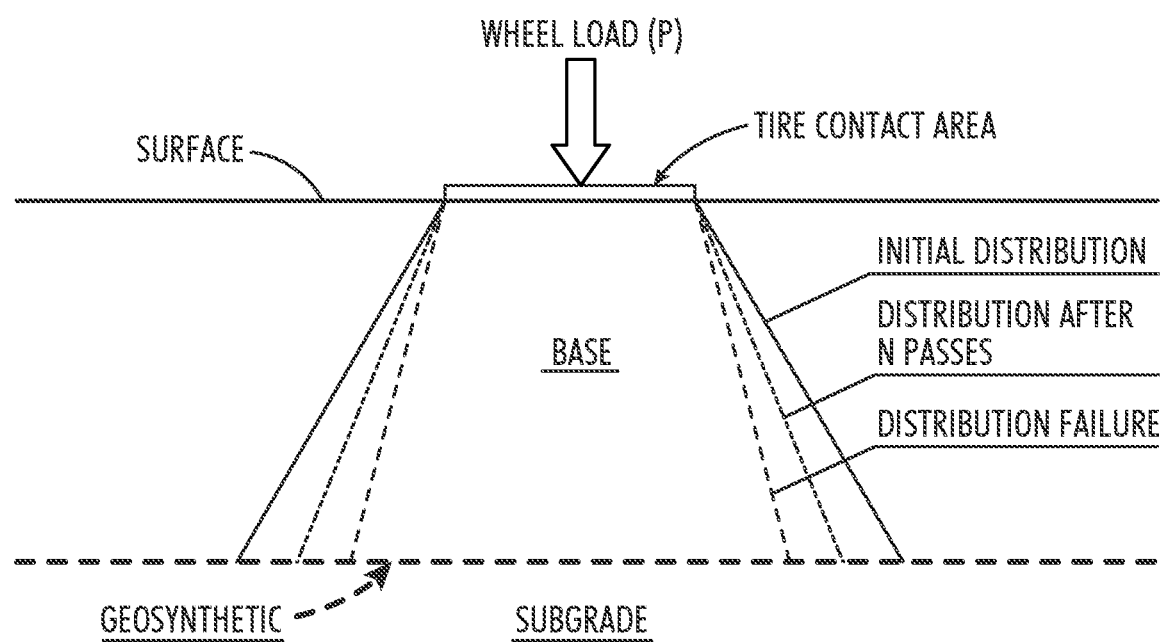
FIG. 20 is an illustration of example forces on pavement infrastructure.

Shifting focus to that of sensor enabled geogrids for pavement and road infrastructure. FIG. 20 is an illustration of example forces on pavement or road infrastructure. The distribution of forces as well as the directional forces are constant wear and tear on pavement and road infrastructure. Many installations are critical to the modern economy and there is a long sought need for reliable detection and maintenance of pavement and road infrastructure. The sensor enabled geogrid within pavement infrastructure enables a plurality of sensors to monitor the status, health, and/or condition of pavement infrastructure without having to use specialized equipment and/or measures that may cause further degradation, such as drilling or penetrating into the surface.

Figure 21A:
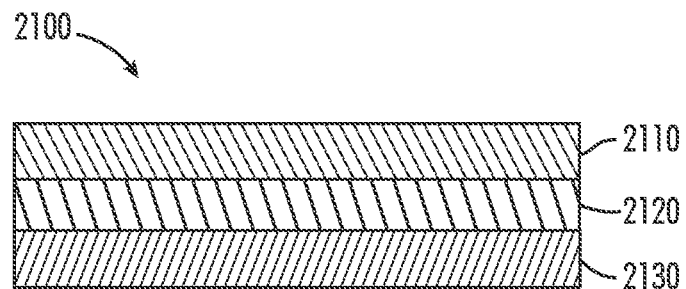
FIG. 21A is an illustration of example pavement infrastructure.
Figure 22A:
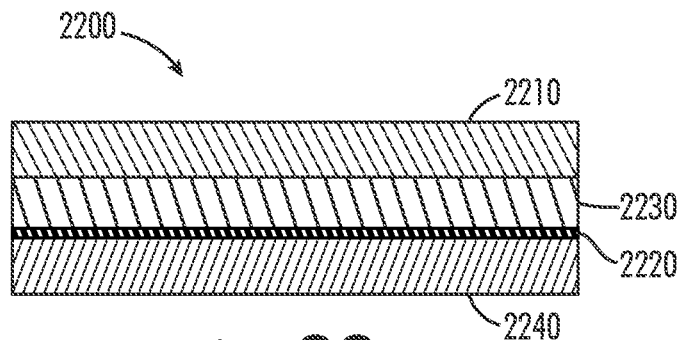
FIG. 22A is an illustration of an example sensor enabled pavement infrastructure.
Figure 22B:
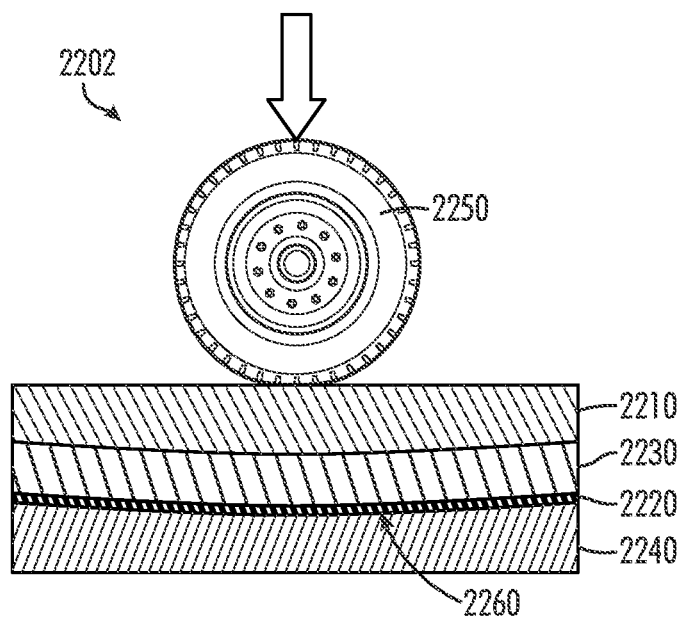
FIG. 22B is an illustration of an example sensor enabled pavement infrastructure experiencing a change in condition and/or health of the system.
Figure 23:
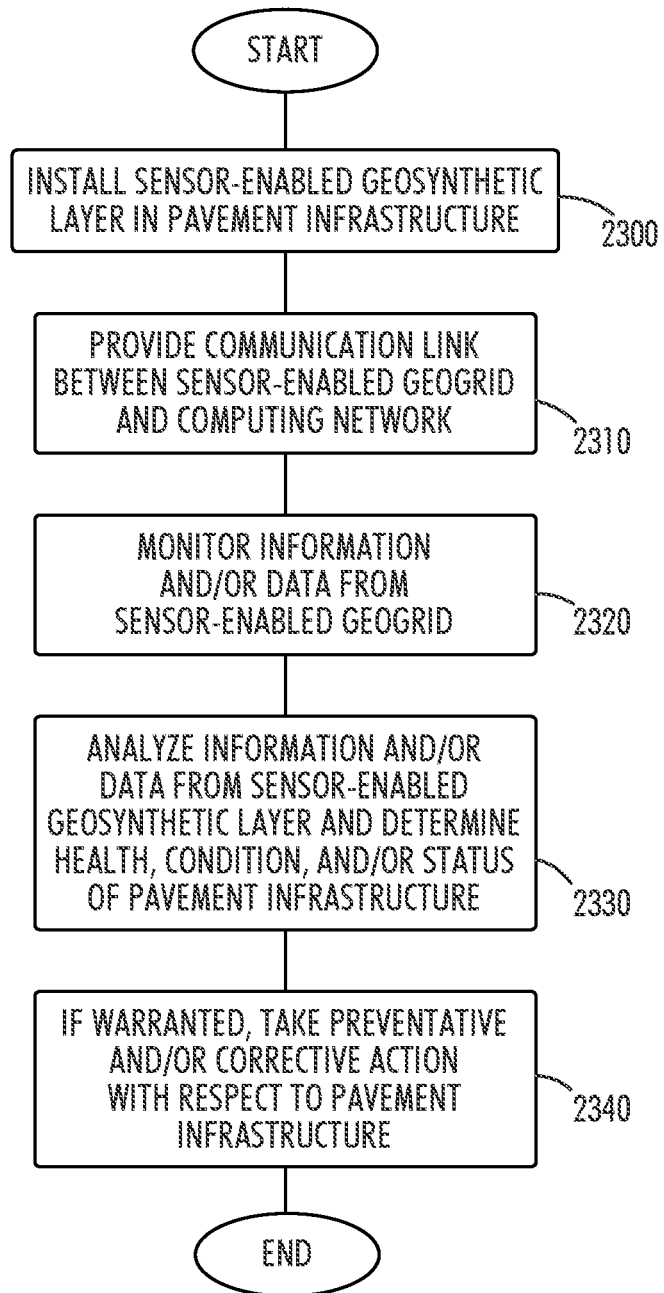
FIG. 23 is a flow diagram of an example of a method for monitoring the condition and/or health of pavement infrastructure.

FIGS. 21-23 disclose embodiments of systems and methods of sensor enabled geogrid in pavement and road infrastructure. In FIG. 21A a sample of pavement infrastructure is illustrated. The surface course (2110) is the top layer that is in contact with traffic loads and forces. Characteristics of the surface course (2110) include friction, smoothness, noise control, rut resistance, and drainage. Further, the surface course (2110) is typically designed to prevent drainage to the lower courses to control erosion and washout. The surface course will most often comprise asphalt or aggregate that is mixed with a binder, such as mineral aggregate mixed with asphaltic material. The base course (2120) is the layer immediately below the surface course (2110), it typically provides distribution of forces and assists in drainage. The base course (2120) typically includes crushed stone, crushed slag, crushed or recycled gravel, and sand, or combinations of these materials. Often times a transition course such as a binder course may exist between the surface course (2110) and the base course (2120). The subbase course (2130) functions primarily as structural support and often includes the lowest quality of materials. The subbase course (2130) often is made from the local soil or site soil and environment. The examples herein are not exhaustive, many varieties of layers and coatings to road and pavement infrastructure are possible and will be known by those of skill in the art.

Figure 21B:
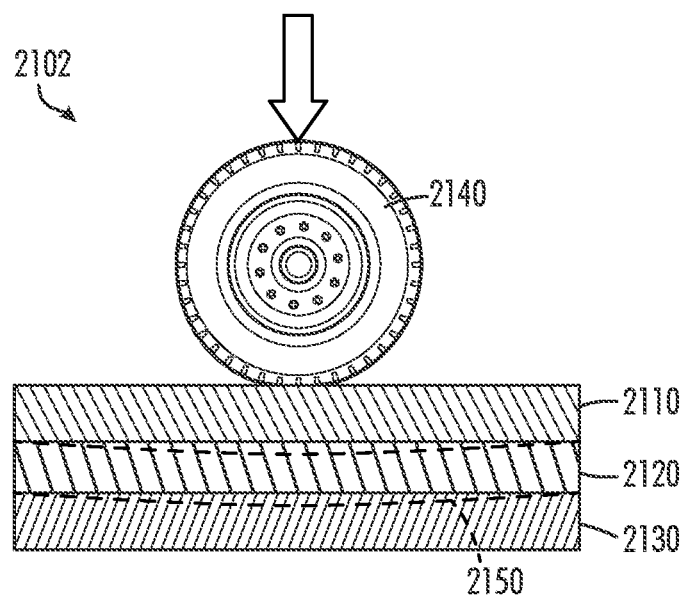
FIG. 21B is an illustration of example change in condition and/or health of pavement infrastructure.

FIG. 21B is an illustration of forces from a tire (2140) on pavement infrastructure (2102). In the example the forces from the tire impact the layers and show degradation (2150) forming from stress and strain. Eventually, when a depression occurs due to loss of subbase course (2130) or through improper drainage of the surface course (2110) or base course (2120), a washout may occur or other damage that produces ruts and channels that increase the risk and damage to vehicles. Further, traffic counts and/or loadings can increase erosion due to supporting soil shifting from repetitive stress and forces. This often causes cracks to occur, sometimes increasing subsurface moisture (a detectable aspect of the present disclosure), as well as increased strain and or flex on the sensor enabled geogrid. Even further, temperatures, the freeze and thaw cycle of water within the pavement infrastructure may further increase erosion and forces on the sensor enabled geogrid.

In FIGS. 22A-B illustrations of example embodiments of sensor enabled pavement and road are disclosed. In FIG. 22A, one aspect has two layers of sensor enabled geogrid (2200) in which the first sensor enabled geogrid resides within the base course (2220) and another resides within the subbase course (2240). In typical embodiments only one sensor enabled geogrid is in place and may reside within the base course, aiding in retaining aggregate material and also sensing, through the one or more sensors, changes in the health and/or condition of the pavement or road infrastructure. In FIG. 22B an example of a tire (2250) applying force, wherein the continual force has caused a washout or other deformation, illustrating the strain and forces on the geogrid structure (2220). These illustrations are but a few examples and are exemplary of how forces may deform the sensor enabled geogrid and allow for detection or change in the health and/or condition of pavement and road infrastructure.

FIG. 23 is a flow diagram of an example of a method for monitoring the condition and/or health of pavement infrastructure. First, in the example of FIG. 23 a sensor enabled geosynthetic layer is installed in pavement infrastructure (2300). This geosynthetic layer may be a geogrid, a geofabric, or other geocomposites/geopolymers. Further, the geogrid may be multiaxial and the rigid members may be used for placement of the various sensors such as a strain gauge and a flex sensor. Continuing in our example, a communication link is provided (2310) between the sensor enabled geogrid within the pavement infrastructure to a computing network, wherein the computing network may reside in a cloud computing environment or a local computing environment. Further, the computing network is capable of hosting an application, a web application, a dynamic server applet, or any other application in rendering the information from a relational or unstructured database. The information from the sensor enabled geogrid within the pavement infrastructure is monitored (2320) and analyzed (2330) to determine the health, condition, and/or status of the pavement infrastructure. Lastly, if warranted, preventative measures and/or corrective action may be taken with regards to the pavement infrastructure. Corrective actions may include repairing and replacing sections of pavement infrastructure, as well as remediating and recovering infrastructure. Further, in additional examples, lifecycle monitoring and analytics are collected and used to perform additional monitoring over installed pavement, including creating things such as a value index, determining preferential grade and wear, and also rating different regions on strength of subgrade and other attributes and characteristics.

Figure 24:
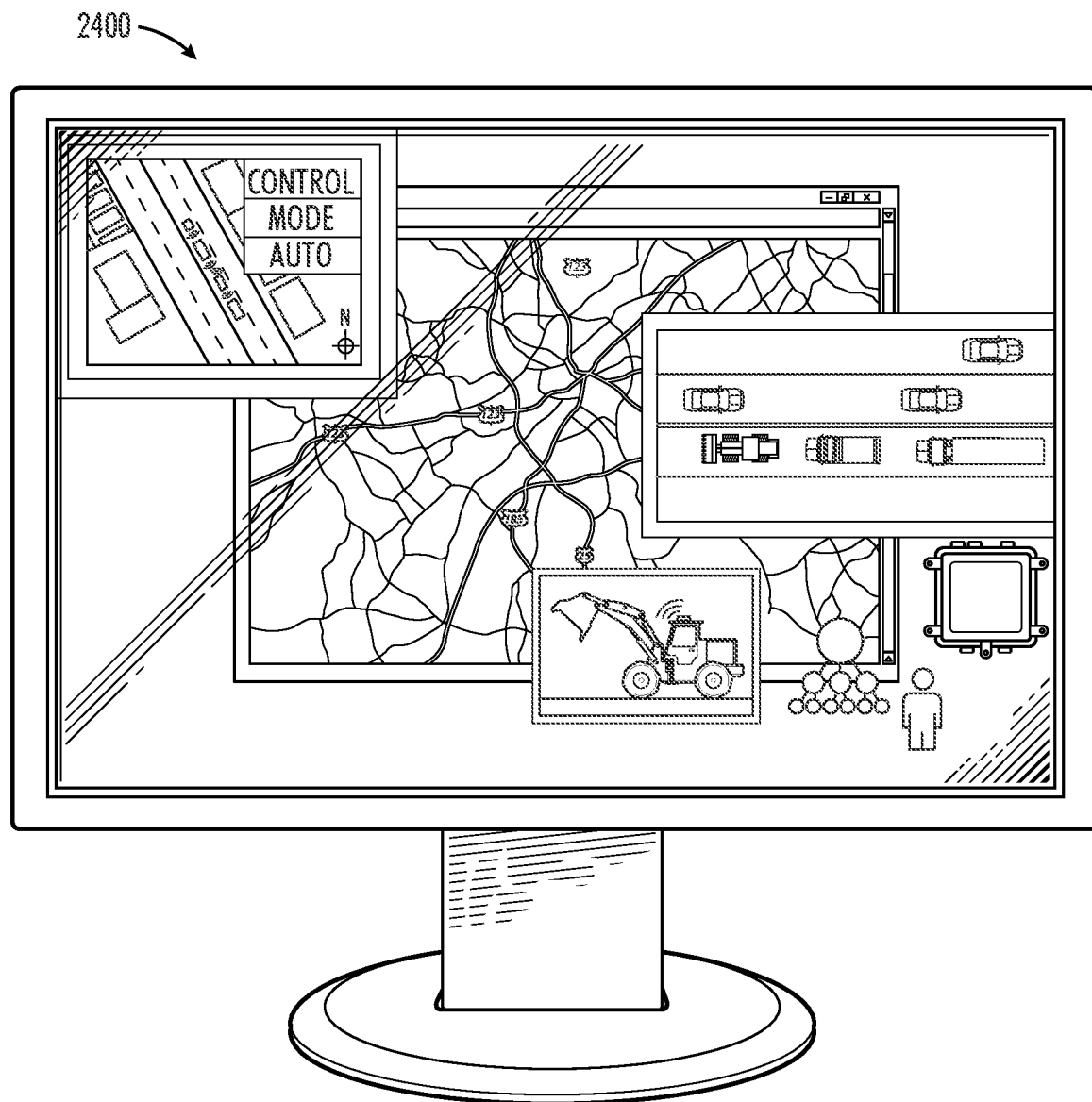
FIG. 24 is an example of a user interface from a computing network displaying the system of sensor enabled infrastructure.

Referring now to FIG. 24. In FIG. 24 an example embodiment of a user interface from a computing network is illustrated. The user interface will typically populate with sensor information, schematics, diagrams, alerts, messages, and other information related to the status, condition and/or health of infrastructure equipped with a sensor enabled grid and the disclosure herein. The user interface is where preventative and/or corrective action may be taken with respect to the substructure of interest. For example, based on the results of the analysis performed by the computing network and the end user, certain preventative maintenance, certain repairs, and/or certain replacement of substructure may occur. It is also contemplated that other analysis parameters could be monitored, such as lifecycle analysis (i.e., how much life is left in the structure based on a design life assumption). These types of analyses could be useful in capital planning so the current system is not just envisioned as a maintenance tool, but could also be used generally as a capital and operations planning tool.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments ±100%, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

Therefore, the following is claimed:

1. A system for rail track infrastructure monitoring, comprising:
   rail track infrastructure;
   a sensor enabled geogrid, comprising:
      a multiaxial geogrid;
      two or more sensors, comprising at least a strain gauge and an accelerometer, operatively configured to the multiaxial geogrid;
   a microcontroller housed in a protective sensor pod, wherein the microcontroller receives signals from the sensor enabled geogrid;
   a communication network, wherein the communication network transmits the received signals from the microcontroller to a computer network; and
   the computer network operatively configured to display information from the one or more sensors about the health, condition, and/or status of the rail track infrastructure based upon at least a base strain gauge measurement parameter, an accelerometer measurement parameter, and a max strain amount parameter, wherein the accelerometer measurement parameter is used to filter out erroneous strain.

2. The system of claim 1, wherein the sensor enabled geogrid further comprises a temperature sensor, or a moisture sensor, or a flex gauge.

3. The system of claim 1, wherein the sensor enabled geogrid is placed within or above a sub grade layer.

4. The system of claim 1, further comprising a plurality of sensor enabled geogrid placed in various substrate layers of the rail track infrastructure.

5. The system of claim 1, wherein the sensor enabled geogrid is a hexagonal geosynthetic.

6. The system of claim 1, further comprising a gateway, wherein the gateway is configured to receive signals from the sensor enabled geogrid.

7. The system of claim 1, wherein the computer network is further configured to a software platform for interpreting the received signals.

8. The system of claim 1, wherein the computer network is further configured to a user interface.

9. A method for rail track infrastructure monitoring, comprising:
   installing a multiaxial sensor enabled geogrid in a rail track infrastructure, comprising a strain gauge and an accelerometer;
   providing a microcontroller housed in a protective sensor pod, wherein the microcontroller receives signals from the multiaxial sensor enabled geogrid;
   providing a communication link from the microcontroller housed in the sensor pod to a computing network;
   analyzing information from the multiaxial sensor enabled geogrid, wherein analyzing processes the information with an infrastructure processing engine by comparing a base strain gauge measurement with a max strain amount;
   filtering the information from the multiaxial sensor enabled geogrid, wherein filtering is performed by the infrastructure processing engine using the accelerometer data to filter out erroneous strain; and
   identifying in the information changes in the strain gauge measurement that exceed the max strain amount of the rail track infrastructure.

10. The method of claim 9, further comprising taking preventative measures and/or corrective measures to the rail track infrastructure.

11. The method of claim 9, wherein installing the multi-axial sensor enabled geogrid places the geogrid within or above a sub grade layer of the rail track infrastructure.

12. The method of claim 9, wherein installing the multi-axial sensor enabled geogrid places a flex sensor on a surface of the multiaxial sensor enabled geogrid to detect flex on the multiaxial sensor enabled geogrid.

13. The method of claim 9, wherein the infrastructure processing engine communicates with a plurality of multi-axial sensor enabled geogrids.

14. The method of claim 9, further comprising detecting, by the multiaxial sensor enabled geogrid, a washout condition on rail track infrastructure subgrade, from a convex bend on the strain gauge.

15. The method of claim 9, further comprising detecting, by the multiaxial sensor enabled geogrid, a washout condition on rail track infrastructure ballast, from a convex bend on the strain gauge.

16. The system of claim 1, wherein the microcontroller housed in the sensor pod is further configured with a battery and a communications adapter that is capable of transmitting the signals to the communication network.

17. The method of claim 9, wherein the microcontroller housed in the sensor pod is further configured with a battery and a communications adapter that is capable of transmitting the signals to the computing network.

\* \* \* \* \*